United States Patent
Ohno

(10) Patent No.: US 12,333,860 B2
(45) Date of Patent: Jun. 17, 2025

(54) METHOD FOR DETECTING OPENING AND CLOSING OF EYE, DEVICE FOR DETECTING OPENING AND CLOSING OF EYE, AND NON-TRANSITORY COMPUTER-READABLE RECORDING MEDIUM RECORDING PROGRAM FOR DETECTING OPENING AND CLOSING OF EYE

(71) Applicants: Swallow Incubate Co., Ltd., Ibaraki (JP); Panasonic Holdings Corporation, Osaka (JP)

(72) Inventor: Toshikazu Ohno, Ibaraki (JP)

(73) Assignees: SWALLOW INCUBATE CO., LTD., Ibaraki (JP); PANASONIC HOLDINGS CORPORATION, Osaka (JP)

( * ) Notice: Subject to any disclaimer, the term of this patent is extended or adjusted under 35 U.S.C. 154(b) by 487 days.

(21) Appl. No.: 17/841,841

(22) Filed: Jun. 16, 2022

(65) Prior Publication Data

US 2022/0309832 A1    Sep. 29, 2022

Related U.S. Application Data

(63) Continuation of application No. PCT/JP2021/021993, filed on Jun. 9, 2021.

(30) Foreign Application Priority Data

Dec. 22, 2020    (JP) ................ 2020-212910

(51) Int. Cl.
*G06V 40/18* (2022.01)
*G06T 7/90* (2017.01)

(52) U.S. Cl.
CPC .............. *G06V 40/18* (2022.01); *G06T 7/90* (2017.01); *G06T 2207/10024* (2013.01)

(58) Field of Classification Search
CPC .... G06V 20/597; G06V 40/16; G06V 40/168; G06V 40/18–197; G06V 40/174–179;
(Continued)

(56) References Cited

U.S. PATENT DOCUMENTS

| | | | |
|---|---|---|---|
| 2008/0252745 A1* | 10/2008 | Nakamura ........... | H04N 23/611 348/222.1 |
| 2012/0087541 A1* | 4/2012 | Hiroshi .................... | A61B 5/18 382/103 |
| 2019/0065898 A1* | 2/2019 | Liu ...................... | G06V 40/171 |

FOREIGN PATENT DOCUMENTS

| | | | |
|---|---|---|---|
| CN | 111738241 A | * | 10/2020 |
| CN | 112052721 A | * | 12/2020 |

(Continued)

OTHER PUBLICATIONS

International Search Report issued Sep. 7, 2021 in International (PCT) Application No. PCT/JP2021/021993.

*Primary Examiner* — Vu Le
*Assistant Examiner* — Jack Peter Kraynak
(74) *Attorney, Agent, or Firm* — Wenderoth, Lind & Ponack, L.L.P.

(57) ABSTRACT

A device for detecting opening and closing of an eye acquires a first image taken by an image taking device, including a face of a person; generates a second image including an eye region of the person from the first image; generates a third image in which pixels having a gradation value smaller than a threshold are represented at a first luminance value and pixels having a gradation value not smaller than the threshold are represented at a second luminance value, by binarizing the second image; determines whether the eye of the person is opened or closed, on (Continued)

the basis of a height of the third image and a maximum height which is the maximum of a vertical distance between an upper pixel and a lower pixel in a first luminance region having the first luminance value; and outputs information indicative of a result of the determination.

13 Claims, 26 Drawing Sheets

(58) Field of Classification Search
CPC .. G06T 7/90; G06T 2207/10024; G06F 3/013
See application file for complete search history.

(56) References Cited

FOREIGN PATENT DOCUMENTS

| | | | |
|---|---|---|---|
| JP | 10-44824 | | 2/1998 |
| JP | 2008-84109 | | 4/2008 |
| JP | 2008084109 A | * | 4/2008 |
| JP | 2008-262447 | | 10/2008 |
| JP | 2009219555 A | * | 10/2009 |
| JP | 2012-252383 | | 12/2012 |
| JP | 2016-9306 | | 1/2016 |
| WO | WO-2020015145 A1 | * | 1/2020 ........... G06K 9/0061 |

* cited by examiner

80 PIXELS
263 PIXELS
421

64 PIXELS
288 PIXELS
422

METHOD FOR DETECTING OPENING AND CLOSING OF EYE, DEVICE FOR DETECTING OPENING AND CLOSING OF EYE, AND NON-TRANSITORY COMPUTER-READABLE RECORDING MEDIUM RECORDING PROGRAM FOR DETECTING OPENING AND CLOSING OF EYE

TECHNICAL FIELD

The present disclosure relates to a technique for detecting opening and closing of an eye of a person from an image.

BACKGROUND ART

The technique of detecting opening and closing of an eye of a person from an image comes into focus as an essential technology for estimating a feeling or a state of a person (e.g., a degree of wakefulness of a person and a degree of fatigue of an eye). The following documents are known to be concerned with the technique of detecting opening and closing of an eye of a person.

For example, a device for determining opening and closing of an eye in Patent Literature 1 includes: an edge detecting part for performing an edge detection of an eye region on the basis of an input image; a binarization processing part for performing a binarization process on the eye region that has underwent the edge detection; and an eye opening and closing determination part for determining opening and closing of an eye on the basis of the eye region that has underwent the binarization process.

For example, an image processing device in Patent Literature 2 includes: an eye region identifying part for identifying from a taken image including a face an eye region including an eye; an eye opening and closing determining part for determining whether the eye is opened or closed; and an image processing part for performing different processes on the eye region according to cases that the eye is opened or closed.

However, in the conventional techniques described above, the accuracy in the detection of opening and closing of an eye of a person is low. Thus, it has been required that the technique of detecting opening and closing of an eye be further improved.

CITATION LIST

Patent Literature

Patent Literature 1: Japanese Unexamined Patent Publication No. 2008-84109
Patent Literature 2: Japanese Unexamined Patent Publication No. 2016-9306

SUMMARY OF INVENTION

The present disclosure has been made to solve the above-mentioned problem, and the object thereof is to provide a technique for improving accuracy in the detection of opening and closing of an eye of a person.

A method for detecting opening and closing of an eye according to an aspect of the present disclosure, by a computer, includes: acquiring a first image taken by an image taking device, including a face of a person; generating a second image including an eye region of the person from the first image; generating a third image in which pixels having a gradation value smaller than a threshold are represented at a first luminance value and pixels having a gradation value not smaller than the threshold are represented at a second luminance value, by binarizing the second image; and determining whether the eye of the person is opened or closed, on the basis of a height of the third image and a maximum height which is the maximum of a vertical distance between an upper pixel and a lower pixel in a first luminance region having the first luminance value; and outputting information indicative of a result of the determination.

The present disclosure enables improvement of the accuracy in the detection of opening and closing of an eye of a person.

DESCRIPTION OF EMBODIMENTS

Underlying Findings for Present Disclosure

Figure 1:
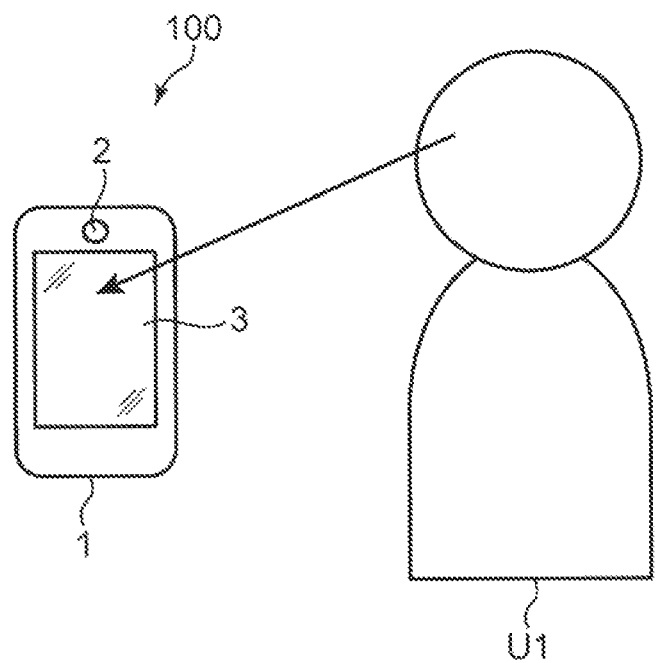
FIG. 1 is a diagram of a system for detecting opening and closing of an eye according to an embodiment 1 of the present disclosure.

In the determination of opening and closing of an eye in Patent Literature 1 above, the eye is determined to be opened when a proportion of the black pixels among the pixels resulting from the binarization process is not smaller than a threshold, and the eye is determined to be closed when the proportion of the black pixels is smaller than the threshold.

In the determination of opening and closing of an eye in Patent Literature 2 above, in each of a right eye region and a left eye region, the eye is determined to be opened when the number of pixels in white which is one color resulting from the binarization is larger than a predetermined number of pixels, and the eye is determined to be closed when the number of the pixels in white which is one color resulting from the binarization is not larger than the predetermined number of pixels.

There are individual differences in the size and the shape of eyes of persons. There is also likelihood that a false eyelash and make-up affect and change the size and the shape of an eye of a person. Therefore, it is difficult to detect opening and closing of an eye of a person with a high accuracy, even if opening and closing of an eye are detected according to the proportion or number of pixels in one color resulting from the binarization as by the conventional techniques described above.

To solve the above-mentioned problem, a method for detecting opening and closing of an eye according to an aspect of the present disclosure, by a computer, includes: acquiring a first image taken by an image taking device, including a face of a person; generating a second image including an eye region of the person from the first image; generating a third image in which pixels having a gradation value smaller than a threshold are represented at a first luminance value and pixels having a gradation value not smaller than the threshold are represented at a second luminance value, by binarizing the second image; determining whether the eye of the person is opened or closed, on the basis of a height of the third image and a maximum height which is the maximum of a vertical distance between an upper pixel and a lower pixel in a first luminance region having the first luminance value; and outputting information indicative of a result of the determination.

This configuration allows determination as to whether the eye of the person is opened or closed, on the basis of a height of the third image obtained by binarizing the second image including the eye region of the person and a maximum height which is the maximum of a vertical distance between an upper pixel and a lower pixel in a first luminance region having the first luminance value, thus suppressing effects caused by individual differences in the size and the shape of eyes of persons, enabling improvement of the accuracy in the detection of opening and closing of an eye of a person.

Further, in the method for detecting opening and closing of an eye, in the determination, it may be determined whether the maximum height in the first luminance region is larger than a value obtained by multiplying the height of the third image by a first factor; and it may be determined that the eye is opened when the maximum height in the first luminance region is determined to be larger than the value obtained by multiplying the height of the third image by the first factor.

The respective ratios of the maximum height in the first luminance region to the height of the third image in the cases that the eye is opened and that the eye is closed are different from each other. In the case that the eye is opened, the height of the third image becomes substantially the same as the maximum height in the first luminance region. Therefore, the comparison between the maximum height in the first luminance region and the value obtained by multiplying the height of the third image by the first factor enables highly accurate determination that the eye is opened.

Further, in the method for detecting opening and closing of an eye described above, in the determination, it may be determined whether the maximum height in the first luminance region is smaller than a value obtained by multiplying the height of the third image by a second factor smaller than the first factor when the maximum height in the first luminance region is determined to be not larger than the value obtained by multiplying the height of the third image by the first factor; and it may be determined that the eye is closed when the maximum height in the first luminance region is determined to be smaller than the value obtained by multiplying the height of the third image by the second factor.

The respective ratios of the maximum height in the first luminance region to the height of the third image in the cases that the eye is opened and that the eye is closed are different from each other. The maximum height in the first luminance region in the case that the eye is closed is shorter than the maximum height in the first luminance region in the case that the eye is opened. Therefore, the comparison between the maximum height in the first luminance region and the value obtained by multiplying the height of the third image by the second factor smaller than the first factor enables highly accurate determination that the eye is closed.

Further, the method for detecting opening and closing of an eye described above may further include: generating a fourth image indicative of a face region of the person from the first image, and, in the determination, it may be determined whether the maximum height in the first luminance region is smaller than a value obtained by multiplying a height of the fourth image by the second factor and a third factor smaller than the second factor when the maximum height in the first luminance region is determined to be not smaller than the value obtained by multiplying the height of the third image by the second factor; and the eye may be determined to be closed when the maximum height in the first luminance region is smaller than the value obtained by multiplying the height of the fourth image by the second factor and the third factor; and the eye may be determined to be opened when the maximum height in the first luminance region is not smaller than the value obtained by multiplying the height of the fourth image by the second factor and the third factor.

In this configuration, whether the eye of the person is opened or closed is determined on the basis of not only the ratio of the maximum height in the first luminance region to the height of the third image including the eye region of the person but also the ratio of the maximum height in the first luminance region to the height of the fourth image indicative of the face region of the person. Thus, opening and closing of an eye can be detected with a higher accuracy.

Further, the method for detecting opening and closing of an eye described above may further include: generating a fourth image indicative of a face region of the person from the first image, and, in the determination, it may be determined whether the maximum height in the first luminance region is smaller than a value obtained by multiplying a height of the fourth image by a second factor smaller than the first factor and a third factor smaller than the second factor when the maximum height in the first luminance region is determined to be not larger than the value obtained by multiplying the height of the third image by the first factor; and the eye may be determined to be closed when the maximum height in the first luminance region is determined to be smaller than the value obtained by multiplying the height of the fourth image by the second factor and the third factor; and the eye may be determined to be opened when the maximum height in the first luminance region is not smaller than the value obtained by multiplying the height of the fourth image by the second factor and the third factor.

In this configuration, whether the eye is closed or not is determined, not on the basis of the ratio of the maximum height in the first luminance region to the height of the third image including the eye region of the person, but on the basis of the ratio of the maximum height in the first luminance region to the height of the fourth image indicative of the face region of the person. Thus, opening and closing of an eye can be detected with a high accuracy even in the case that the third image is not properly detected.

Further, in the method for detecting opening and closing of an eye described above, the second image may have a rectangular shape, and, in the determination, it may be determined whether the eye of the person is opened or closed on the basis of a ratio between a height and a width of the second image when the maximum height in the first luminance region is determined to be not smaller than the value obtained by multiplying the height of the third image by the second factor.

The height of a closed eye is likely to be shorter than that of an opened eye. Therefore, even in the case that opening and closing of an eye cannot be determined on the basis of the height of the third image and the maximum height in the first luminance region, opening and closing of the eye can be determined on the basis of the aspect ratio of the second image including the eye region of the person, enabling improvement of the accuracy in the detection of opening and closing of an eye of a person.

Further, in the method for detecting opening and closing of an eye described above, the second image may be represented by a red component, a green component, and a blue component; and the method may further include: generating from the second image a fifth image represented by a hue component, a saturation component, and a value component when the maximum height in the first luminance region is determined to be not smaller than the value obtained by multiplying the height of the third image by the second factor; generating a sixth image in which a pixel having a gradation value smaller than a threshold is represented at a third luminance value and a pixel having a gradation value not smaller than the threshold is represented at a fourth luminance value, by binarizing the hue component of the fifth image; and determining, on the basis of a third luminance region having the third luminance value, whether the eye of the person is opened or closed.

The difference between a taken visible light image of an opened eye and a taken visible light image of a closed eye is whether a cornea part reflects light or not. In other words, the cornea part of the opened eye reflects light while there is no cornea part when the eye is closed. The light reflected in the cornea part stands out in the hue component in a color space based on the hue component, the saturation component, and the value component. A feature value representing the light reflected in the cornea part is extracted by a sixth image is generated by binarizing the hue component of the fifth image represented by the hue component, the saturation component, and the value component. Therefore, opening and closing of the eye can be determined, by determining presence of the feature value representing the light reflected in the cornea part in the sixth image generated by binarizing the hue component of the fifth image represented by the hue component, the saturation component, and the value component, even in the case that opening and closing of the eye cannot be determined on the basis of the height of the third image and the maximum height in the first luminance region, which enables improvement of the accuracy in the detection of opening and closing of an eye of a person.

Further, the method for detecting opening and closing of an eye described above may further include detecting each position of an upper eyelid and a lower eyelid on the basis of the third image.

In this configuration, each position of the upper eyelid and the lower eyelid is detected on the basis of the third image, enabling estimation of a feeling or a state of a person on the basis of opening and closing of the eye, and the position of the upper eyelid and the position of the lower eyelid.

Further, in the method for detecting opening and closing of an eye described above, in the detection of the position of the upper eyelid and the position of the lower eyelid, a morphological gradient operation on the third image may be performed to detect the position of the upper eyelid and the position of the lower eyelid.

In this configuration, the position of the upper eyelid and the position of the lower eyelid are detected by performing the morphological gradient operation on the binarized third image, enabling highly accurate detection of the position of the upper eyelid and the position of the lower eyelid.

Further, in the method for detecting opening and closing of an eye described above, the third image may be a binary image of one of a right eye and a left eye of the person, and the method may further include detecting each position of an eye outer corner and an eye inner corner on the basis of the third image.

In this configuration, each position of the eye outer corner and the eye inner corner is detected on the basis of the third image, enabling estimation of a feeling or a state of a person on the basis of opening and closing of the eye, and the position of the eye outer corner and the position of the eye inner corner.

Further, in the method for detecting opening and closing of an eye described above, in the detection of the position of the eye outer corner and the position of the eye inner corner in the third image, a position of a pixel which has the first luminance value and is on a left side in lateral directions may be detected as the position of one of the eye outer corner and the eye inner corner; and a position of a pixel which has the first luminance value and is on a right side in the lateral directions may be detected as the position of the other of the eye outer corner and the eye inner corner.

In this configuration, in the third image that is a binary image of one of a right eye and a left eye, a position of a pixel which has the first luminance value and is on a left side in lateral directions is detected as the position of one of the eye outer corner and the eye inner corner; and a position of a pixel which has the first luminance value and is on a right side in the lateral directions is detected as the position of the other of the eye outer corner and the eye inner corner. Therefore, the position of the eye outer corner and the position of the eye inner corner can be easily detected.

Further, the method for detecting opening and closing of an eye described above may further include superimposing information indicating whether the eye is opened or closed on a face image of the person on a display.

In this configuration, information indicating whether the eye is opened or closed is superimposed on a face image of the person on a display, enabling displaying a result of the determination of opening and closing of the eye on the face image in real time.

The present disclosure can be realized not only as a method for detecting opening and closing of an eye in which the distinctive processings as described above are executed, but also as a device for detecting opening and closing of an eye which includes distinctive configurations corresponding to the distinctive procedures executed in the method for detecting opening and closing of an eye. The present disclosure also can be realized as a computer program causing a computer to execute the distinctive processings included in the method for detecting opening and closing of an eye. Accordingly, other aspects described below also can exert similar advantageous effects to the method for detecting opening and closing of an eye described above.

A device for detecting opening and closing of an eye according to another aspect of the present disclosure includes: an acquiring part for acquiring a first image taken by an image taking device, including a face of a person; an eye region detecting part for generating a second image including an eye region of the person from the first image; a binarization processing part for generating a third image in which pixels having a gradation value smaller than a threshold are represented at a first luminance value and pixels having a gradation value not smaller than the threshold are represented at a second luminance value, by binarizing the second image; a determining part for determining whether the eye of the person is opened or closed, on the basis of a height of the third image and a maximum height which is the maximum of a vertical distance between an upper pixel and a lower pixel in a first luminance region having the first luminance value; and an outputting part for outputting information indicative of a result of the determination.

A non-transitory computer-readable recording medium recording a program for detecting opening and closing of an eye according to another aspect of the present disclosure causes a computer to execute processings of: acquiring a first image taken by an image taking device, including a face of a person; generating a second image including an eye region of the person from the first image; generating a third image in which pixels having a gradation value smaller than a threshold are represented at a first luminance value and pixels having a gradation value not smaller than the threshold are represented at a second luminance value, by binarizing the second image; determining whether the eye of the person is opened or closed, on the basis of a height of the third image and a maximum height which is the maximum of a vertical distance between an upper pixel and a lower pixel in a first luminance region having the first luminance value; and outputting information indicative of a result of the determination.

Embodiments of the present disclosure will be described below with reference to the attached drawings. The following embodiments are merely examples realized from the present disclosure and the technical scope of the present disclosure is not limited thereto.

Embodiment 1

FIG. 1 is a diagram of a system 100 for detecting opening and closing of an eye according to an embodiment 1 of the present disclosure. The system 100 for detecting opening and closing of an eye is configured in a mobile terminal device such as a smartphone or a tablet. This configuration is merely an example, and the system 100 for detecting opening and closing of an eye may be configured in a desktop computer, or by a proper combination with a cloud server, a camera, and a display.

The system 100 for detecting opening and closing of an eye includes a device 1 for detecting opening and closing of an eye, an image taking device 2, and a display 3. The device 1 for detecting opening and closing of an eye detects opening and closing of an eye of a person U1 in an image taken by the image taking device 2.

The image taking device 2 is constituted by a camera mounted on the mobile terminal device. The image taking device 2 is a camera capable of taking a color visible light image at a predetermined frame rate.

The display 3 is constituted by a displaying device such as a liquid-crystal display or an organic electro-luminescence (EL) display mounted on the mobile terminal device. The display 3 displays an image of a face of the person U1 taken by the image taking device 2. The display 3 further displays information on opening and closing of the eye detected by the device 1 for detecting opening and closing of an eye, the information being superimposed on the image of the face of the person U1.

Figure 2:
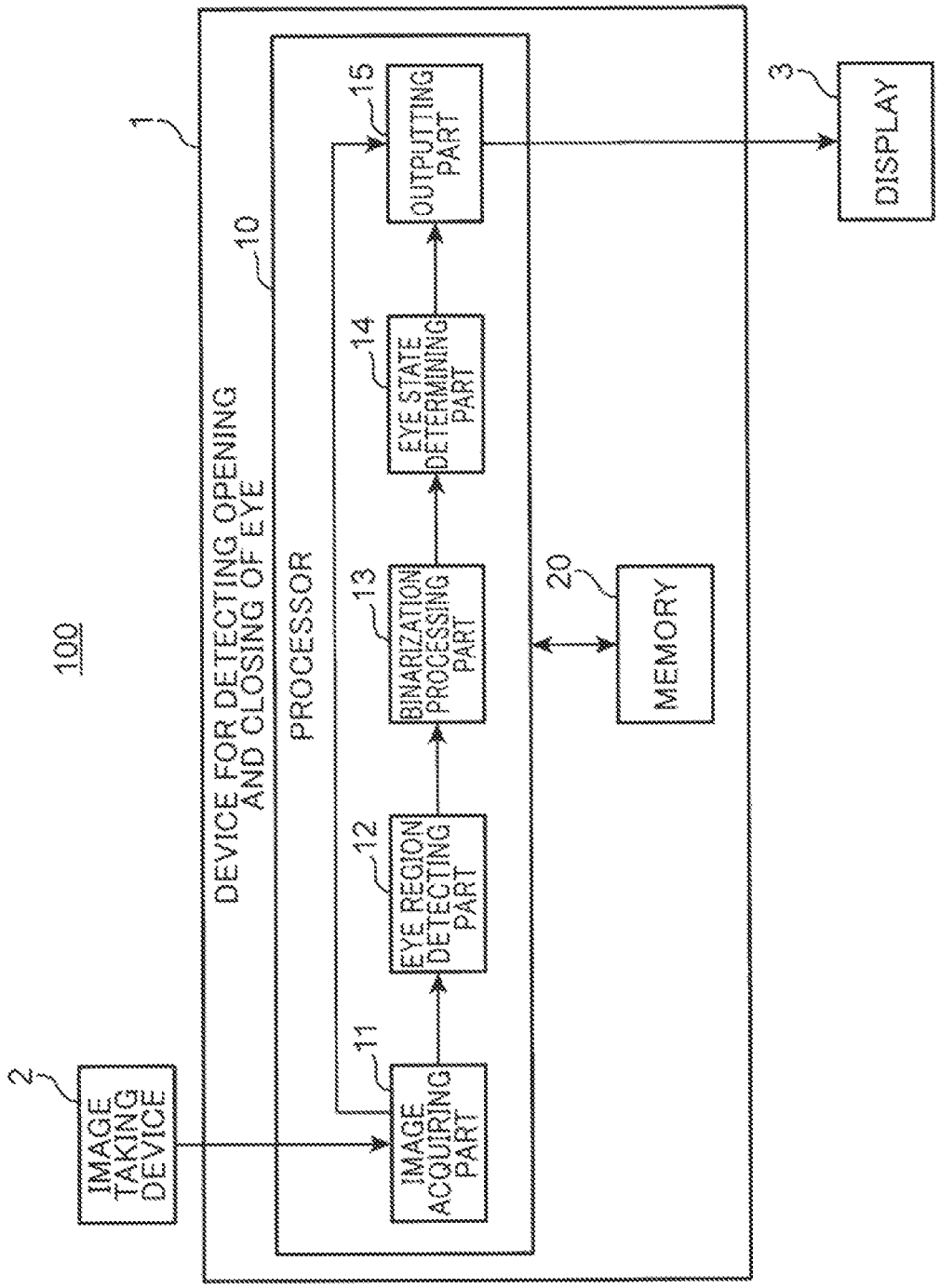
FIG. 2 is a block diagram showing an exemplary whole structure of the system for detecting opening and closing of the eye according to the embodiment 1 of the present disclosure.

FIG. 2 is a block diagram showing an exemplary whole structure of the system 100 for detecting opening and closing of the eye according to the embodiment 1 of the present disclosure. The device 1 for detecting opening and closing of an eye includes a processor 10 and a memory 20. The processor 10 includes, for example, a central processing unit (CPU). The processor 10 includes an image acquiring part 11, an eye region detecting part 12, a binarization processing part 13, an eye state determining part 14, and an outputting part 15. The image acquiring part 11, the eye region detecting part 12, the binarization processing part 13, the eye state determining part 14, and the outputting part 15 do performance, for example, when the processor 10 executes the program for detecting opening and closing of an eye.

The image acquiring part 11 acquires an image taken by the image taking device 2. The acquired image includes the face of the person U1. Hereinafter, an image including a face is referred to as a face image. The image acquiring part 11 sequentially acquires face images taken at a predetermined frame rate. The face image is an exemplary first image including a face of a person.

The eye region detecting part 12 generates an eye detection region including an eye region of a person from a face image. The eye region detecting part 12 detects a face region indicative of a face of a person from the face image acquired by the image acquiring part 11. The eye region detecting part 12 may detect the face region by inputting the face image to a classifier prepared for detecting the face region. The classifier includes, for example, a Haar cascade classifier. The face region is, for example, a region having a rectangular shape having a size of the entirety of the face. The face region is an exemplary fourth image indicative of a face region of a person.

The eye region detecting part 12 detects the eye detection region by inputting the face region to a classifier prepared for detecting the eye detection region. The classifier includes, for example, a Haar cascade classifier. The eye detection region is a region having a rectangular shape with an upper side, a lower side, and right and left sides, the upper side being tangent to the upper eyelid, the lower side being tangent to the lower eyelid, one of the right and left sides being tangent to the eye inner corner, and the other of the right and left sides being tangent to the eye outer corner. The eye region detecting part 12 detects an eye detection region including the left eye and an eye detection region including the right eye from the face region. The eye detection region is an exemplary second image including an eye region of a person.

Hereinafter, the eye detection region including the left eye is referred to as "the left eye detection region", and the eye detection region including the right eye is referred to as "the right eye detection region". A simple reference to "the eye detection region" means either of "the left eye detection region" or "the right eye detection region". "The left eye" means an eye on the left side in a front view of the person U1, and "the right eye" means an eye on the right side in the front view of the person U1. This relation is merely an example, and may be inversed.

The binarization processing part 13 generates a binary image in which pixels having a gradation value smaller than a threshold is represented at a first luminance value and pixels having a gradation value not smaller than the threshold is represented at a second luminance value, by binarizing the eye detection region. The binary image is an exemplary third image. In the case that the eye detection region is occupied by a color image, the binarization processing part 13 may convert the eye detection region into, for example, a grayscale image having gradation values from 0 to 255, and execute the binarization process on the converted grayscale image. The binarization process is executed, for example, by Otsu's method. The first luminance value and the second luminance value are represented in, for example, white and black, respectively. In other words, in the embodiment 1, a binary image in which a dark spot is represented by white and a bright spot is represented by black is generated. The respective luminance values of white and black are represented at, for example, 255 and 0.

The image taken by the image taking device 2 is an image quantized in 8 bits. Therefore, the gray scale image has gradation values from 0 to 255, but this is merely an example. In the case that the image taken by the image taking device 2 is quantized in another number of bits (e.g., 16 bits), the grayscale image may have gradation values that can be represented by this number of bits.

The binarization processing part 13 may generate respective binary images of the left eye detection region and the right eye detection region.

The eye state determining part 14 determines whether the eye of the person is opened or closed, on the basis of a height of the binary image and a maximum height which is the maximum of a vertical distance between an upper pixel and a lower pixel in a first luminance region having the first luminance value.

Specifically, the eye state determining part 14 determines whether the maximum height in the first luminance region is larger than a value obtained by multiplying the height of the binary image by a first factor. The first factor is, for example, 0.9. The eye state determining part 14 determines that the eye is opened when the maximum height in the first luminance region is determined to be larger than the value obtained by multiplying the height of the binary image by the first factor.

The eye state determining part 14 determines whether the maximum height in the first luminance region is smaller than a value obtained by multiplying the height of the binary image by a second factor smaller than the first factor when the maximum height in the first luminance region is determined to be not larger than the value obtained by multiplying the height of the binary image by the first factor. The second factor is, for example, 0.6. The eye state determining part 14 determines that the eye is closed when the maximum height in the first luminance region is determined to be smaller than the value obtained by multiplying the height of the binary image by the second factor.

The outputting part 15 outputs information indicative of a result of the determination. The outputting part 15 superimposes information indicative of opening and closing of the eye, determined by the eye state determining part 14, on the face image acquired by the image acquiring part 11 to generate a display picture, and displays the display picture on the display 3.

The memory 20 is a storage device capable of storing various kinds of information, e.g., a random access memory (RAM), a solid state drive (SSD), or a flash memory. The memory 20 serves as a working area for the processor 10. The memory 20 may store the information indicative of opening and closing of the eye determined by the eye state determining part 14 with the information being associated with the face image acquired by the image acquiring part 11.

The face image associated with the information indicative of opening and closing of the eye can be used as teaching data for machine learning of a discriminative model for discriminating opening and closing of an eye from a face image. In other words, the outputting part 15 may assign the information indicative of opening and closing of the eye serving as a label to the face image and store the face image assigned with the label in the memory 20.

Next, the eye opening and closing detection process by the device 1 for detecting opening and closing of an eye in the embodiment 1 will be described.

Figure 3:
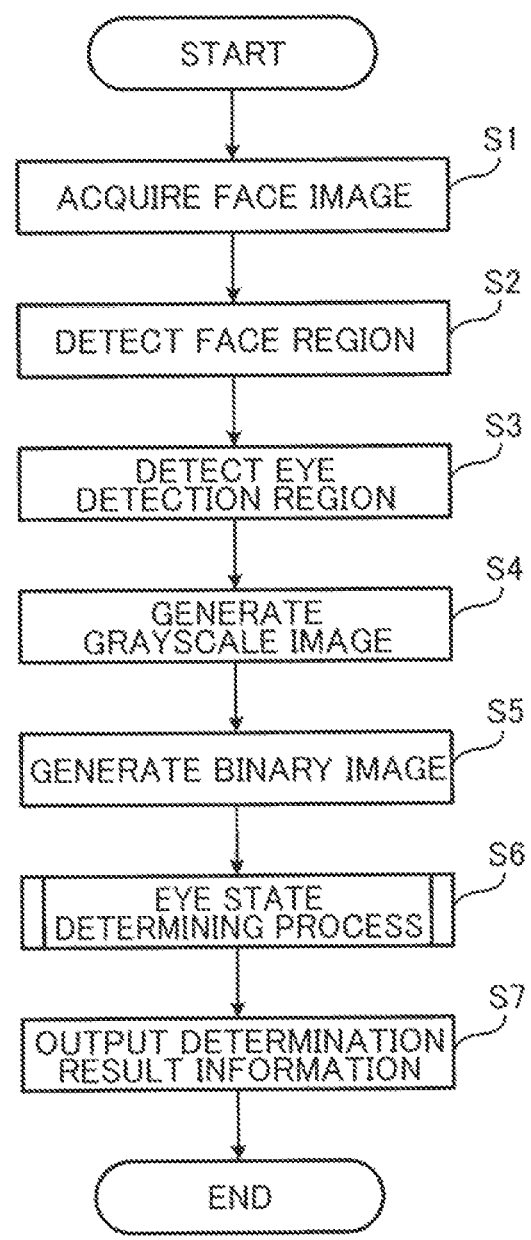
FIG. 3 is a flowchart showing an exemplary eye opening and closing detection process by a device for detecting opening and closing of the eye according to the embodiment 1 of the present disclosure.

FIG. 3 is a flowchart showing an exemplary eye opening and closing detection process by a device 1 for detecting opening and closing of the eye according to the embodiment 1 of the present disclosure. The process shown in the flowchart of FIG. 3 is executed at a predetermined sampling period. The predetermined sampling period is, for example, a frame period of the image taking device 2.

First, in the step S1, the image acquiring part 11 acquires a face image from the image taking device 2.

Next, in the step S2, the eye region detecting part 12 detects a face region by inputting the face image to the classifier for detecting the face region.

Figure 5:
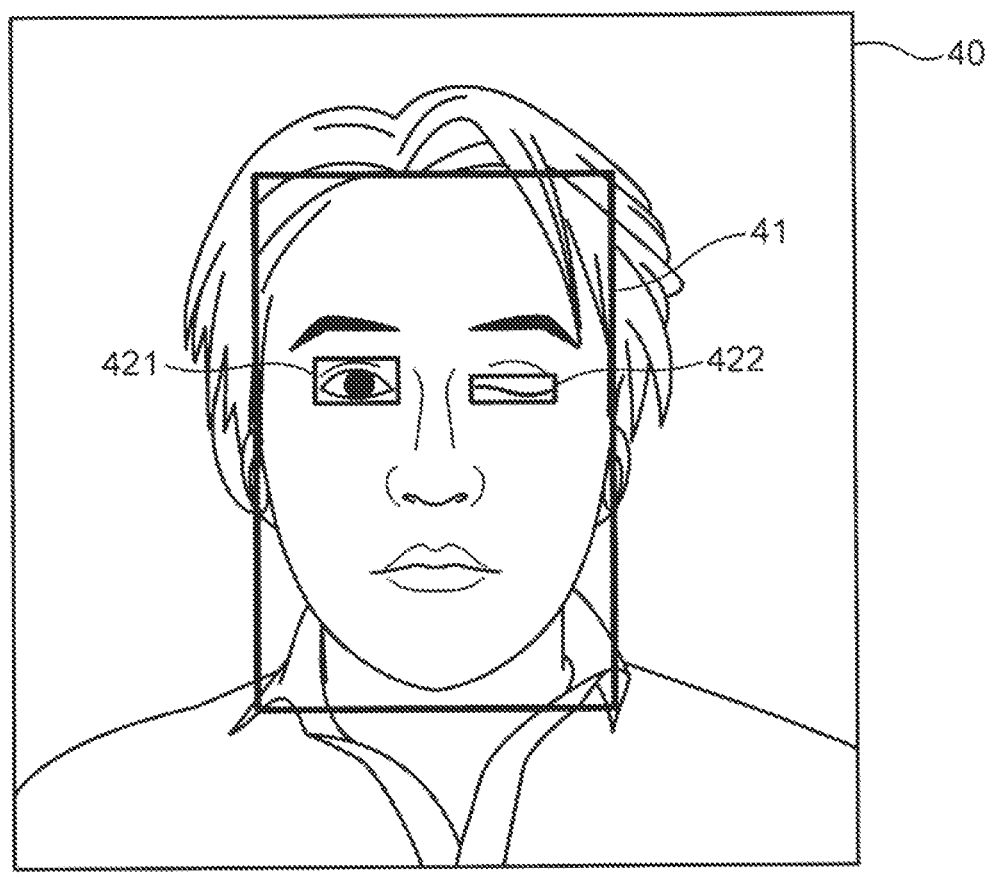
FIG. 5 is an illustration showing an exemplary face region to be detected from a face image.

FIG. 5 is an illustration showing an exemplary face region 41 to be detected from a face image 40. As shown in FIG. 5, the eye region detecting part 12 detects a region having a rectangular shape and including an upper portion of the forehead, a lower portion of the chin, and roots of the ears as the face region 41. The face region 41 does not include the whole hair, but a face region may include the whole hair. In FIG. 5, the face image 40 is a taken front image of the person U1, and includes a left eye and a right eye. As shown in FIG. 5, the left eye of the person U1 is opened, and the right eye of the person U1 is closed.

Next, in the step S3, the eye region detecting part 12 detects an eye detection region by inputting the face region 41 extracted in the step S2 to the classifier for detecting the eye detection region. As shown in FIG. 5, the eye region detecting part 12 detects regions each having a rectangular shape and including the entirety of an eye as eye detection regions 421, 422. The eye detection region 421 corresponds to the left eye, and the eye detection region 422 corresponds to the right eye.

Figure 6:
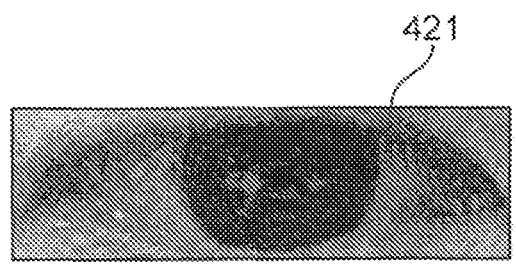
FIG. 6 is an illustration showing an exemplary eye detection region corresponding to a left eye.
Figure 7:
FIG. 7 is an illustration showing an exemplary eye detection region corresponding to a right eye.

FIG. 6 is an illustration showing an exemplary eye detection region 421 corresponding to a left eye. FIG. 7 is an illustration showing an exemplary eye detection region 422 corresponding to a right eye. As shown in FIG. 6, the eye detection region 421 has a rectangular shape and includes the entirety of an opened left eye. As shown in FIG. 7, the eye detection region 422 has a rectangular shape and includes the entirety of a closed right eye. From the face region 41 shown in FIG. 5, the eye detection region 421 corresponding to the left eye shown in FIG. 6 and the eye detection region 422 corresponding to the right eye shown in FIG. 7 are extracted.

The upper side, the lower side, the right side, and the left side of the eye detection region 421 of the opened eye are tangent to the upper eyelid, the lower eyelid, the eye inner corner, and the eye outer corner, respectively. The upper side, the lower side, the right side, and the left side of the eye detection region 422 of the closed eye are tangent to the upper eyelid, a tip portion of eyelashes, the eye outer corner, and the eye inner corner, respectively.

Next, in the step S4, the binarization processing part 13 converts each of the eye detection regions 421, 422 detected in the step S3 into a grayscale image. The converting process into the grayscale image is, for example, a process of calculating the average of each gradation value of the red component, the green component, and the blue component of each pixel forming the eye detection regions 421, 422. This process is merely an example, and another process may be executed as the converting process into the grayscale images.

Next, in the step S5, the binarization processing part 13 generates respective binary images 431, 432 by binarizing the eye detection regions 421, 422 after the conversion thereof into the grayscale images.

Figure 8:
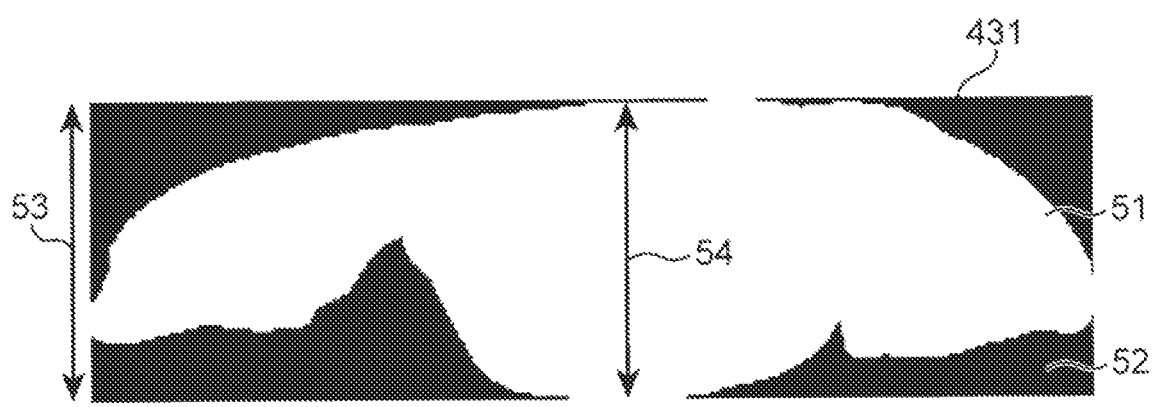
FIG. 8 is an illustration showing an exemplary binary image corresponding to the left eye.
Figure 9:
FIG. 9 is an illustration showing an exemplary binary image corresponding to the right eye.

FIG. 8 is an illustration showing an exemplary binary image 431 corresponding to the left eye. FIG. 9 is an illustration showing an exemplary binary image 432 corresponding to the right eye. The binarization processing part 13 generates the binary images 431, 432 by binarizing the eye detection regions 421, 422 after the conversion thereof into the grayscale images.

The left eye is opened. Therefore, in FIG. 8, a generated binary image 431 has: white pixels representing the pixels of dark parts of the eye detection region 421 corresponding to the left eye, including a colored part of an eye, an eyelash, and one portion of a white part of an eye; and black pixels representing the pixels of bright parts thereof, including the other portion of a white part of the eye and skin. The binary image 431 in FIG. 8 includes a white region 51 in an entity which consists of white pixels and a black region 52 in an entity which consists of black pixels.

The right eye is closed. Therefore, in FIG. 9, a generated binary image 432 has: white pixels representing the pixels of dark parts of the eye detection region 422 corresponding to the right eye, including an eyelash and an edge of an upper eyelid; and black pixels representing the pixels of bright parts thereof, including skin. The binary image 432 in FIG. 9 includes a white region 61 in an entity which consists of white pixels and a black region 62 in an entity which consists of black pixels.

Next, in the step S6, the eye state determining part 14 executes an eye state determining process of determining whether the eye of the person is opened or closed, on the basis of a height of the binary image and a maximum height which is the maximum of a vertical distance between an upper pixel and a lower pixel in a first luminance region having the first luminance value. The eye state determining part 14 determines whether each eye of the person in the left eye detection region and the right eye detection region is opened or closed. The eye state determining process will be described later with reference to FIG. 4.

Next, in the step S7, the outputting part 15 outputs determination result information indicative of a result of the determination of opening and closing of the eye determined by the eye state determining part 14. The outputting part 15 generates a display picture in which the determination result information indicative of the result of the determination of opening and closing of the eye determined in the step S6 is superimposed on the face image acquired in the step S1, and displays the display picture on the display 3. The display picture in which the determination result information indicative of the result of the determination of opening and closing of the eye is superimposed on the face image is displayed on the display 3 in real time by repeating the process in the flowchart of FIG. 3 at a predetermined sampling period.

Next, the eye state determining process in the step S6 in FIG. 3 will be described.

Figure 4:
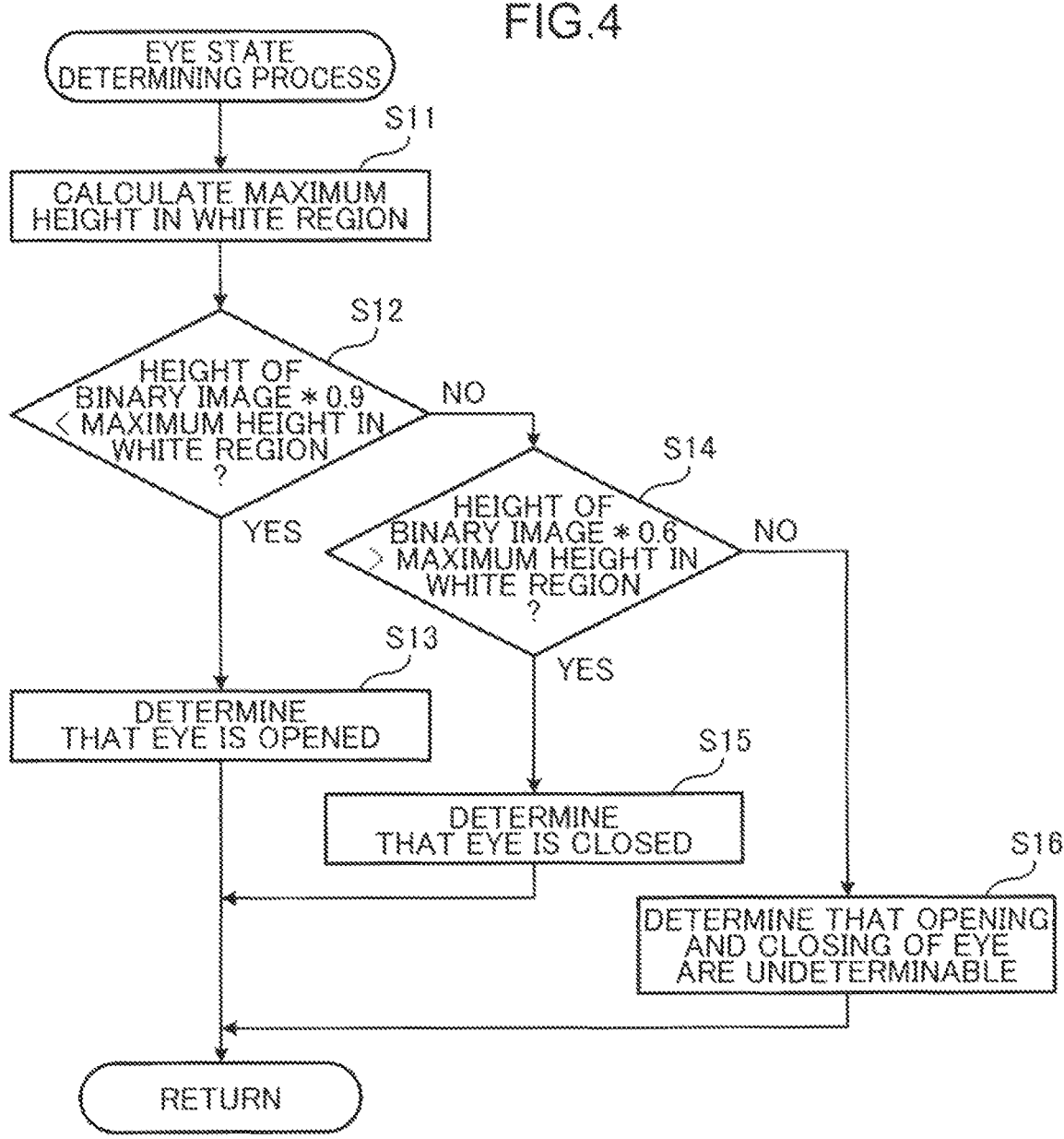
FIG. 4 is a flowchart showing an exemplary eye state determining process in the step S6 in FIG. 3.

FIG. 4 is a flowchart showing an exemplary eye state determining process in the step S6 in FIG. 3.

Next, in the step S11, the eye state determining part 14 calculates a maximum height which is the maximum of a vertical distance between an upper pixel and a lower pixel in a white region having the first luminance value. The eye state determining part 14 calculates the height on each X coordinate in the white region 51 of the binary image 431 shown in FIG. 8 by totaling the number of white pixels on the Y axis passing through each X coordinate. The number of white pixels in vertical directions represents each height. The eye state determining part 14 calculates the height on each X coordinate while shifting the X coordinate by a pixel one after another from the left side to the right side of the white region 51. The eye state determining part 14 calculates the X coordinate where the height is maximum and the maximum height in the white region 51.

In the case that the eye detection region 421 corresponding to the left eye and the eye detection region 422 corresponding to the right eye are detected, respective eye state determining processes are executed on the binary images 431, 432 corresponding to the left eye and the right eye. Thus, the eye state determining part 14 calculates the height on each X coordinate in the white region 61 of the binary image 432 shown in FIG. 9 by totaling the number of white pixels on the Y axis passing through each X coordinate. The eye state determining part 14 calculates the height on each X coordinate while shifting the X coordinate by a pixel one after another from the left side to the right side of the white region 61. The eye state determining part 14 calculates the X coordinate where the height is maximum and the maximum height in the white region 61.

Next, in the step S12, the eye state determining part 14 determines whether the maximum height in the white region is larger than a value obtained by multiplying the height of the binary image of the eye detection region by 0.9.

When the maximum height in the white region is determined to be larger than the value obtained by multiplying the height of the binary image of the eye detection region by 0.9 (YES in the step S12), the eye state determining part 14 determines in the step S13 that the eye is opened. In other words, in the case that the eye is opened as shown in FIG. 8, the ratio of the maximum height 54 in the white region 51 to the height 53 of the binary image 431 of the eye detection region 421 approaches 1. Therefore, in the case that the maximum height 54 in the white region 51 is larger than the value obtained by multiplying the height of the binary image 431 of the eye detection region 421 by 0.9, the eye state determining part 14 determines that the eye in the eye detection region 421 is opened.

On the other hand, when the maximum height in the white region is determined to be not larger than the value obtained by multiplying the height of the binary image of the eye detection region by 0.9 (NO in the step S12), the eye state determining part 14 determines in the step S14 whether the maximum height in the white region is smaller than a value obtained by multiplying the height of the binary image of the eye detection region by 0.6.

When the maximum height in the white region is determined to be smaller than the value obtained by multiplying the height of the binary image of the eye detection region by 0.6 (YES in the step S14), the eye state determining part 14 determines in the step S15 that the eye is closed. In other words, in the case that the eye is closed as shown in FIG. 9, the maximum height 64 in the white region 61 falls below 60% of the height 63 of the binary image 432 of the eye detection region 422. Therefore, in the case that the maximum height 64 in the white region 61 is smaller than the value obtained by multiplying the height of the binary image 432 of the eye detection region 422 by 0.6, the eye state determining part 14 determines that the eye in the eye detection region 422 is closed.

On the other hand, when the maximum height in the white region is determined to be not smaller than the value obtained by multiplying the height of the binary image of the eye detection region by 0.6 (NO in the step S14), the eye state determining part 14 determines in the step S16 that opening and closing of the eye are undeterminable.

When the eye state determining part 14 determines that opening and closing of the eye are undeterminable, the outputting part 15 may output determination result information indicating that opening and closing of the eye are undeterminable, or alternatively does not output the determination result information.

In the embodiment 1, in the case of NO in the step S12, the eye state determining part 14 may determine, without executing the processing in the step S14, that the eye is closed.

In the embodiment 1, after the processing in the step S11 is executed, the eye state determining part 14 may determine, without executing the processing in the step S12, whether the maximum height in the white region is smaller than the value obtained by multiplying the height of the binary image of the eye detection region by 0.6. When the maximum height in the white region is determined to be smaller than the value obtained by multiplying the height of the binary image of the eye detection region by 0.6, the eye state determining part 14 may determine that the eye is closed. When the maximum height in the white region is determined to be not smaller than the value obtained by multiplying the height of the binary image of the eye detection region by 0.6, the eye state determining part 14 may determine that the eye is opened.

Figure 10:
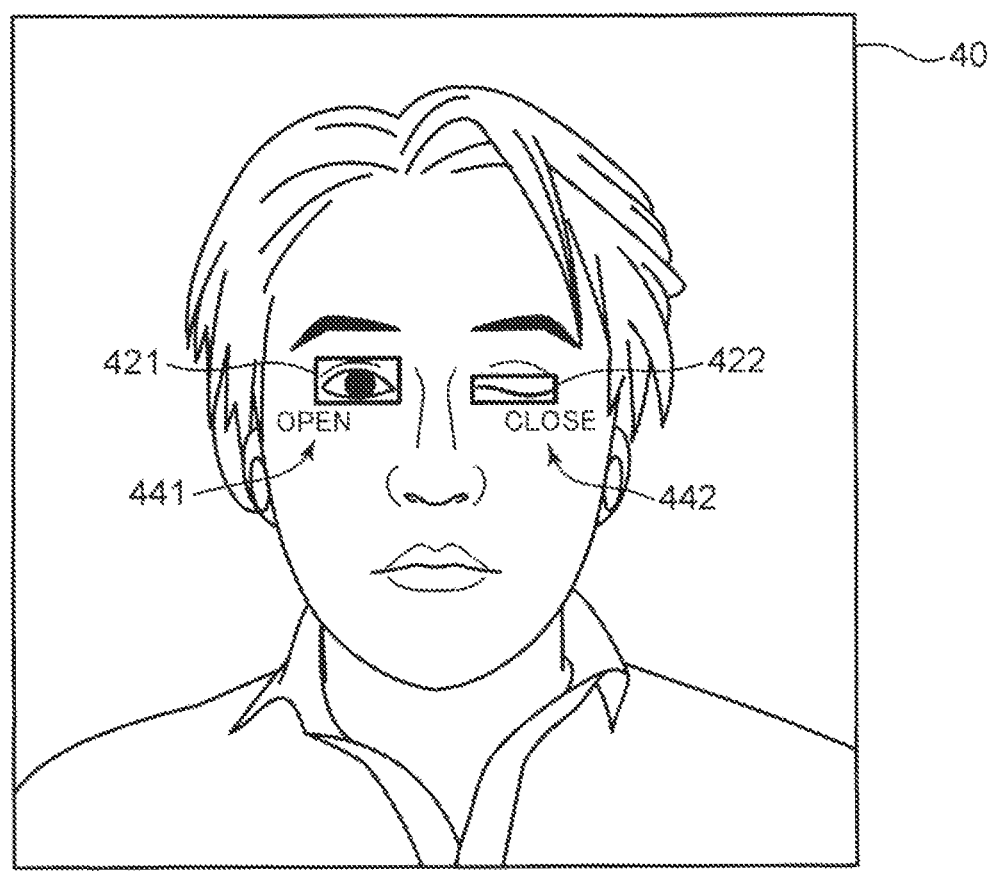
FIG. 10 is an illustration showing an exemplary display picture on a display.

FIG. 10 is an illustration showing an exemplary display picture on a display 3.

The outputting part 15 superimposes determination result information indicating whether the eye is opened or closed on the face image of the person on the display 3. As shown in FIG. 10, the determination result information 441, 442 superimposed on the face image 40 is displayed on the display 3. The determination result information 441 indicates that the eye is opened, and is displayed in the vicinity of the frame defining the eye detection region 421.

For example, as the determination result information 441, the letters "OPEN" indicating that the eye is opened is displayed on the display 3. On the other hand, the determination result information 442 indicates that the eye is closed, and is displayed in the vicinity of the frame defining the eye detection region 422. For example, as the determination result information 442, the letters "CLOSE" indicating that the eye is closed is displayed on the display 3. Such ways of presenting the determination result information 441, 442 are merely examples. The eye detection region 421 indicative of the opening eye and the eye detection region 422 indicative of the closed eye may be displayed on the display 3 in different manners, e.g., in different colors.

The system 100 for detecting opening and closing of an eye may further include a speaker. For example, the outputting part 15 may output sound from the speaker when the eye state determining part 14 determines that the eye is closed.

As described above, it is determined whether the eye of the person is opened or closed, on the basis of a height of the binary image obtained by binarizing the eye detection region including the eye region and a maximum height which is the maximum of a vertical distance between an upper pixel and a lower pixel in a first luminance region having the first luminance value, thus suppressing effects caused by individual differences in the size and the shape of eyes of persons, which enables improvement of the accuracy in the detection of opening and closing of an eye of a person.

Next, a system for detecting opening and closing of an eye in a variation 1 of the embodiment 1 will be described.

In the embodiment 1, in the case that the eye detection region is not properly detected, there is likelihood that: the determination in the step S12 in FIG. 4 does not result in YES even when the eye is actually opened; and the eye is not determined to be opened in the processings following the processing in the step S14. Thus, in the variation 1 of the embodiment 1, opening and closing of the eye is determined on the basis of the height of the face region.

The configuration of the system for detecting opening and closing of an eye in the variation 1 of the embodiment 1 is the same as that of the system for detecting opening and closing of an eye in the embodiment 1. Thus, the configuration of the system for detecting opening and closing of an eye in the variation 1 of the embodiment 1 will be described below with reference to FIGS. 1 and 2.

The eye state determining part 14 in the variation 1 of the embodiment 1 determines whether the maximum height in the first luminance region is smaller than a value obtained by multiplying a height of the face region by the second factor and a third factor smaller than the second factor when the maximum height in the first luminance region is determined to be not smaller than the value obtained by multiplying the height of the binary image by the second factor. The eye state determining part 14 determines that the eye is closed when the maximum height in the first luminance region is smaller than the value obtained by multiplying the height of the face region by the second factor and the third factor. The eye state determining part 14 determines that the eye is opened when the maximum height in the first luminance region is not smaller than the value obtained by multiplying the height of the face region by the second factor and the third factor. The face region is an exemplary fourth image indicative of a face region of a person. The second factor is, for example, 0.6. The third factor is, for example, 0.15.

The value obtained by multiplying the height of the face region by 0.15 can be seen to correspond to the vertical length of the eye, i.e., the height of the eye. The eye state determining part 14 determines whether the maximum height in the first luminance region is smaller than the value obtained by multiplying the height of the face region by the second factor and the third factor. The third factor is not limited to 0.15, and may be a value indicative of a ratio of a height of an eye to a height of a face region.

Next, the eye state determining process in the variation 1 of the embodiment 1 will be described. In the variation 1 of the embodiment 1, the eye opening and closing detection process, except for the eye state determining process, is the same as the eye opening and closing detection process in the embodiment 1 shown in FIG. 3.

Figure 11:
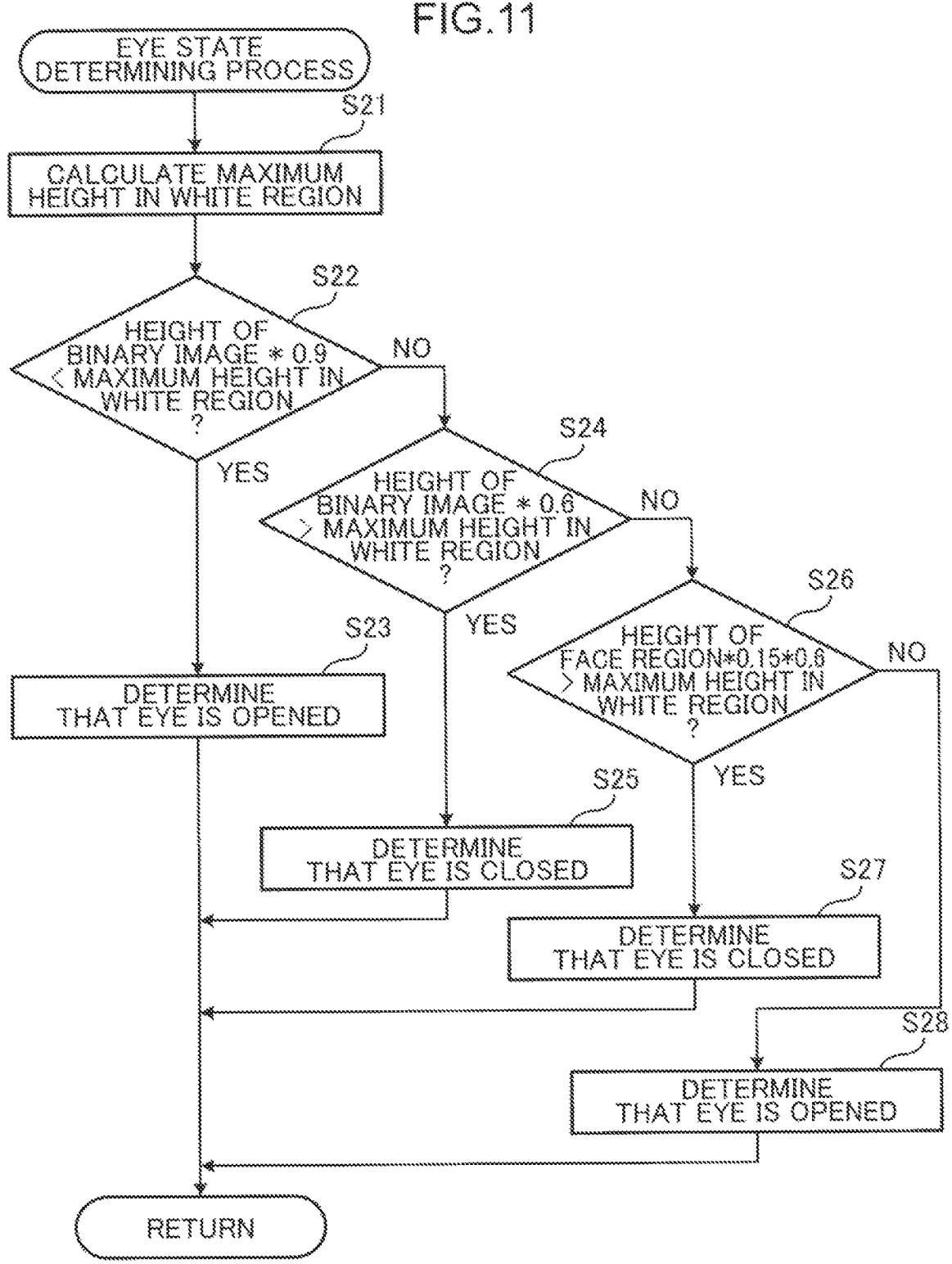
FIG. 11 is a flowchart showing an exemplary eye state determining process in a variation 1 of the embodiment 1.

FIG. 11 is a flowchart showing an exemplary eye state determining process in the variation 1 of the embodiment 1.

Since the processings in the steps S21 to S25 are the same as those in the steps S11 to S15 in FIG. 4, the description thereof will be omitted.

When the maximum height in the white region is determined to be not smaller than the value obtained by multiplying the height of the binary image of the eye detection region by 0.6 (NO in the step S24), the eye state determining part 14 determines in the step S26 whether the maximum height in the white region is smaller than a value obtained by multiplying the height of the face region by 0.15 and 0.6.

When the maximum height in the white region is determined to be smaller than the value obtained by multiplying the height of the face region by 0.15 and 0.6 (YES in the step S26), the eye state determining part 14 determines in the step S27 that the eye is closed.

On the other hand, when the maximum height in the white region is determined to be not smaller than the value obtained by multiplying the height of the face region by 0.15 and 0.6 (NO in the step S26), the eye state determining part 14 determines in the step S28 that the eye is opened.

As described above, in the variation 1 of the embodiment 1, opening and closing of an eye are determined on the basis of not only the ratio of the maximum height in the white region to the height of the binary image of the eye detection region but also the ratio of the maximum height in the white region to the height of the face region. Thus, opening and closing of an eye can be detected with a higher accuracy.

Next, the system 100 for detecting opening and closing of an eye in a variation 2 of the embodiment 1 will be described.

In the embodiment 1, whether the eye is closed or not is determined on the basis of the height of the binary image of the eye detection region. In contrast, in the variation 2 of the embodiment 1, whether the eye is closed or not is determined on the basis of the height of the face region.

The configuration of the system for detecting opening and closing of an eye in the variation 2 of the embodiment 1 is the same as that of the system for detecting opening and closing of an eye in the embodiment 1. Therefore, the configuration of the system for detecting opening and closing of an eye in the variation 2 of the embodiment 1 will be described below with reference to FIGS. 1 and 2.

The eye state determining part 14 in the variation 2 of the embodiment 1 determines whether the maximum height in the first luminance region is smaller than a value obtained by multiplying a height of the face region by a second factor smaller than the first factor and a third factor smaller than the second factor when the maximum height in the first luminance region is determined to be not larger than the value obtained by multiplying the height of the binary image by the first factor. The eye state determining part 14 determines that the eye is closed when the maximum height in the first luminance region is determined to be smaller than the value obtained by multiplying the height of the face region by the second factor and the third factor. The eye state determining part 14 determines that the eye is opened when the maximum height in the first luminance region is determined to be not smaller than the value obtained by multiplying the height of the face region by the second factor and the third factor. The face region is an exemplary fourth image indicative of a face region of a person. The second factor is, for example, 0.6. The third factor is, for example, 0.15.

Next, the eye state determining process in the variation 2 of the embodiment 1 will be described. In the variation 2 of the embodiment 1, the eye opening and closing detection process, except for the eye state determining process, is the same as the eye opening and closing detection process in the embodiment 1 shown in FIG. 3.

Figure 12:
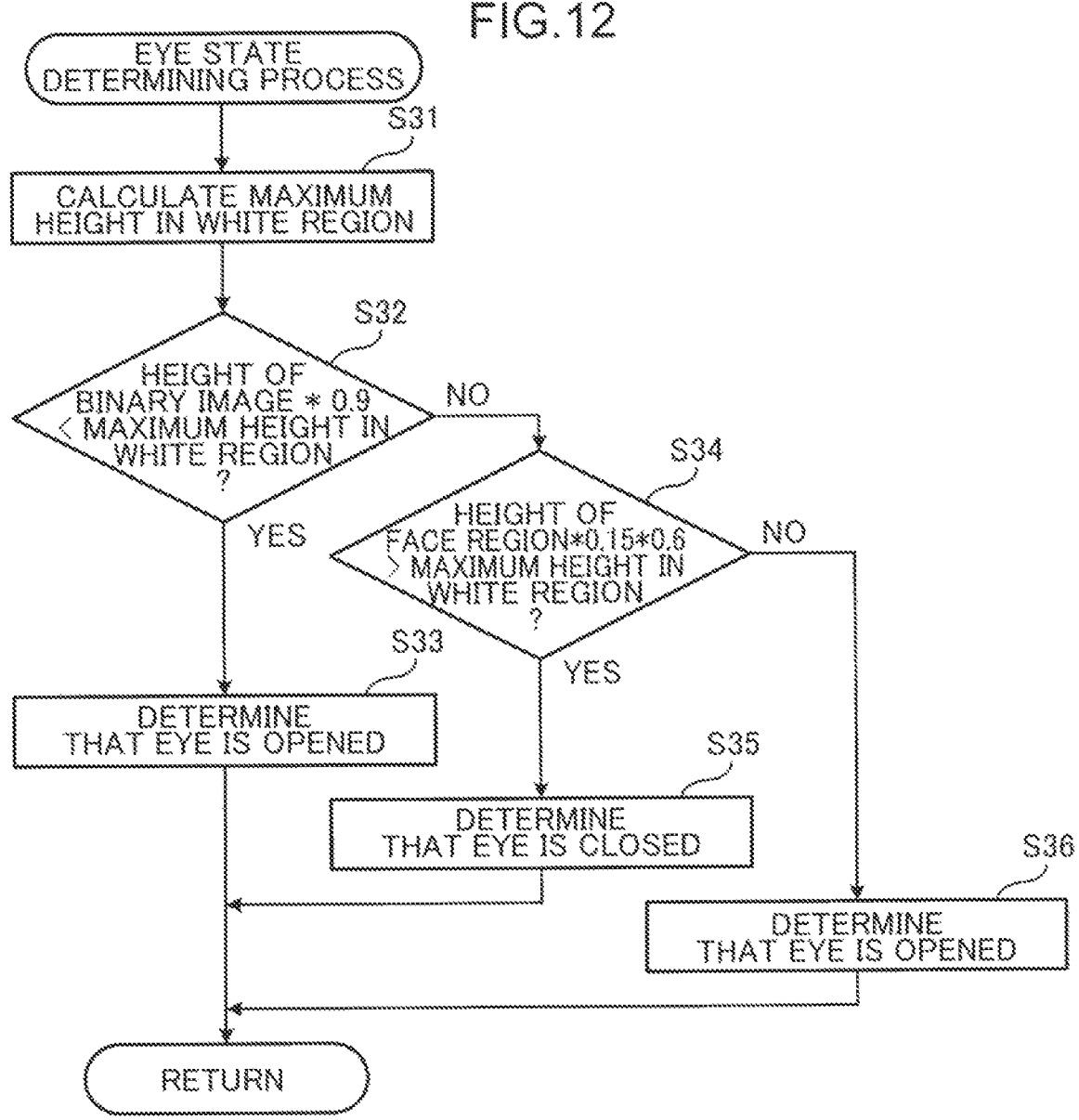
FIG. 12 is a flowchart showing an exemplary eye state determining process in a variation 2 of the embodiment 1.

FIG. 12 is a flowchart showing an exemplary eye state determining process in the variation 2 of the embodiment 1.

Since the processings in the steps S31 to S33 are the same as those in the steps S11 to S13 in FIG. 4, the description thereof will be omitted.

When the maximum height in the white region is determined to be not larger than a value obtained by multiplying the height of the binary image of the eye detection region by 0.9 (NO in the step S32), the eye state determining part 14 determines in the step S34 whether the maximum height in the white region is smaller than a value obtained by multiplying the height of the face region by 0.15 and 0.6.

When the maximum height in the white region is determined to be smaller than the value obtained by multiplying the height of the face region by 0.15 and 0.6 (YES in the step S34), the eye state determining part 14 determines in the step S35 that the eye is closed.

On the other hand, when the maximum height in the white region is determined to be not smaller than the value obtained by multiplying the height of the face region by 0.15 and 0.6 (NO in the step S34), the eye state determining part 14 determines in the step S36 that the eye is opened.

As described above, in the variation 2 of the embodiment 1, whether an eye is closed or not is determined, not on the basis of the ratio of the maximum height in the white region to the height of the binary image of the eye detection region, but on the basis of the ratio of the maximum height in the white region to the height of the face region. Thus, opening and closing of an eye can be detected with a high accuracy even in the case that the eye detection region is not properly detected.

Embodiment 2

In the embodiment 1, the eye state determining part 14 determines that opening and closing of the eye are undeterminable when the maximum height in the white region is determined to be not smaller than the value obtained by multiplying the height of the binary image of the eye detection region by the second factor (e.g., 0.6). In contrast, in the embodiment 2, opening and closing of the eye are determined on the basis of an aspect ratio of the binary image when the maximum height in the white region is determined to be not smaller than the value obtained by multiplying the height of the binary image of the eye detection region by the second factor (e.g., 0.6).

Figure 13:
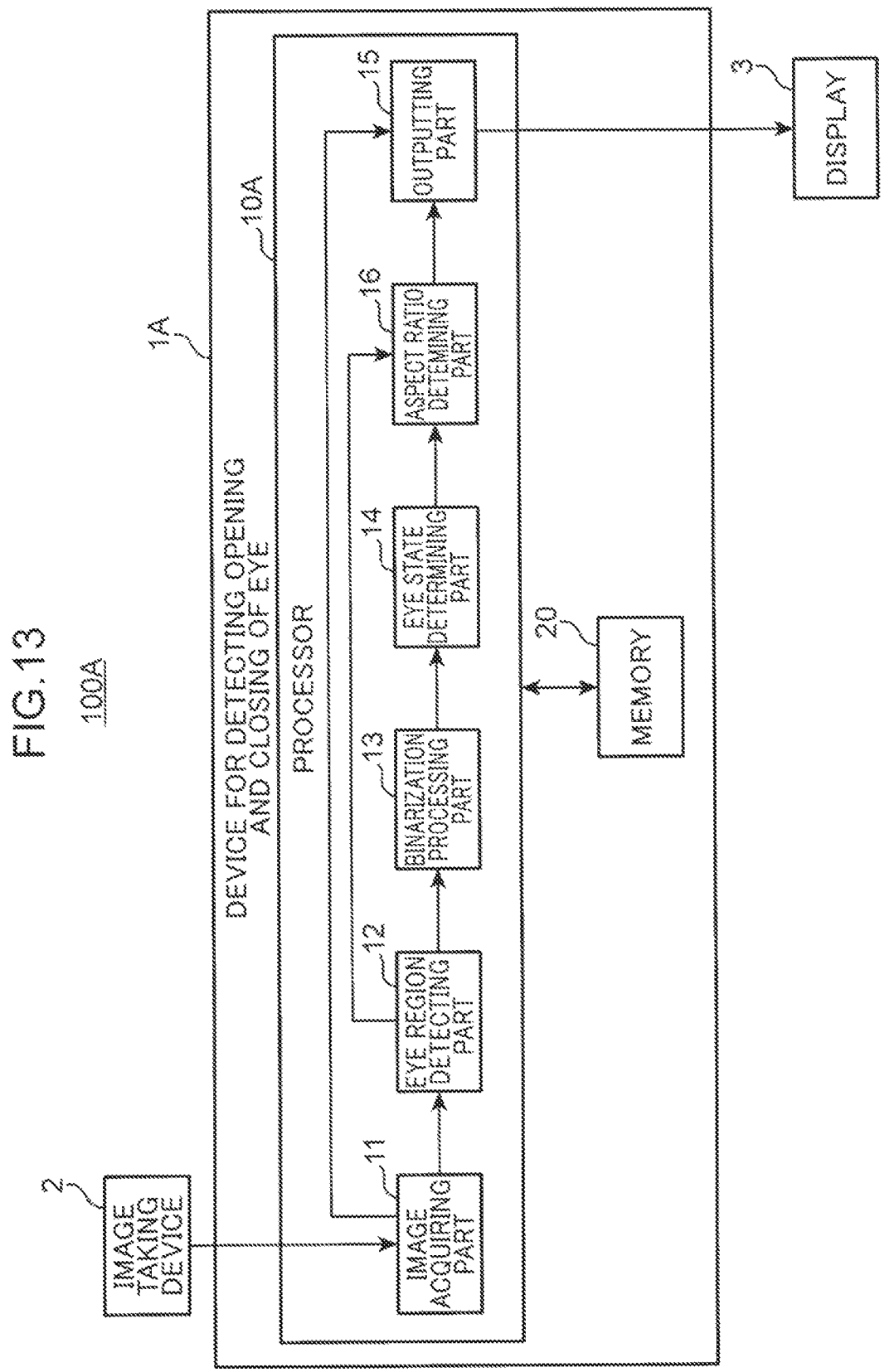
FIG. 13 is a block diagram showing an exemplary whole structure of a system for detecting opening and closing of an eye according to an embodiment 2 of the present disclosure.

FIG. 13 is a block diagram showing an exemplary whole structure of a system 100A for detecting opening and closing of an eye according to the embodiment 2 of the present disclosure. In the embodiment 2, the same constituents as those in the embodiment 1 are denoted by the same reference numerals, and the description thereof will be omitted.

The device 1A for detecting opening and closing of an eye includes a processor 10A and a memory 20. The processor 10A further includes an aspect ratio determining part 16 in comparison with the processor 10 of the device 1 for detecting opening and closing of an eye in the embodiment 1.

The aspect ratio determining part 16 determines whether the eye is opened or closed on the basis of an aspect ratio (ratio between a height and a width) of the eye detection region when the maximum height in the first luminance region is determined to be not smaller than the value obtained by multiplying the height of the binary image by the second factor.

Typically, the respective aspect ratios of an opened eye and a closed eye are likely to be different from each other. In other words, the height of the closed eye is likely to be shorter than the height of the opened eye. Therefore, the aspect ratio determining part 16 determines opening and closing of the eye by comparing the aspect ratio of the eye detection region with a threshold.

Specifically, the aspect ratio determining part 16 determines whether the aspect ratio of the eye detection region is not smaller than the threshold. The aspect ratio of the eye detection region is a value obtained by dividing a width (length in horizontal directions) of the eye detection region having a rectangular shape by a height (length in vertical directions) thereof. The aspect ratio determining part 16 determines that the eye is closed when the aspect ratio of the eye detection region is determined to be not smaller than the threshold. The aspect ratio determining part 16 determines that the eye is opened when the aspect ratio of the eye detection region is determined to be smaller than the threshold.

In the embodiment 2, the aspect ratio determining part 16 determines whether the eye of the person is opened or closed on the basis of the aspect ratio of the eye detection region, which the present disclosure is not particularly limited to. The aspect ratio determining part 16 may determine whether the eye of the person is opened or closed on the basis of the aspect ratio of the binary image of the eye detection region.

Next, the eye state determining process in the embodiment 2 will be described. In the embodiment 2, the eye opening and closing detection process, except for the eye state determining process, is the same as the eye opening and closing detection process in the embodiment 1 shown in FIG. 3.

Figure 14:
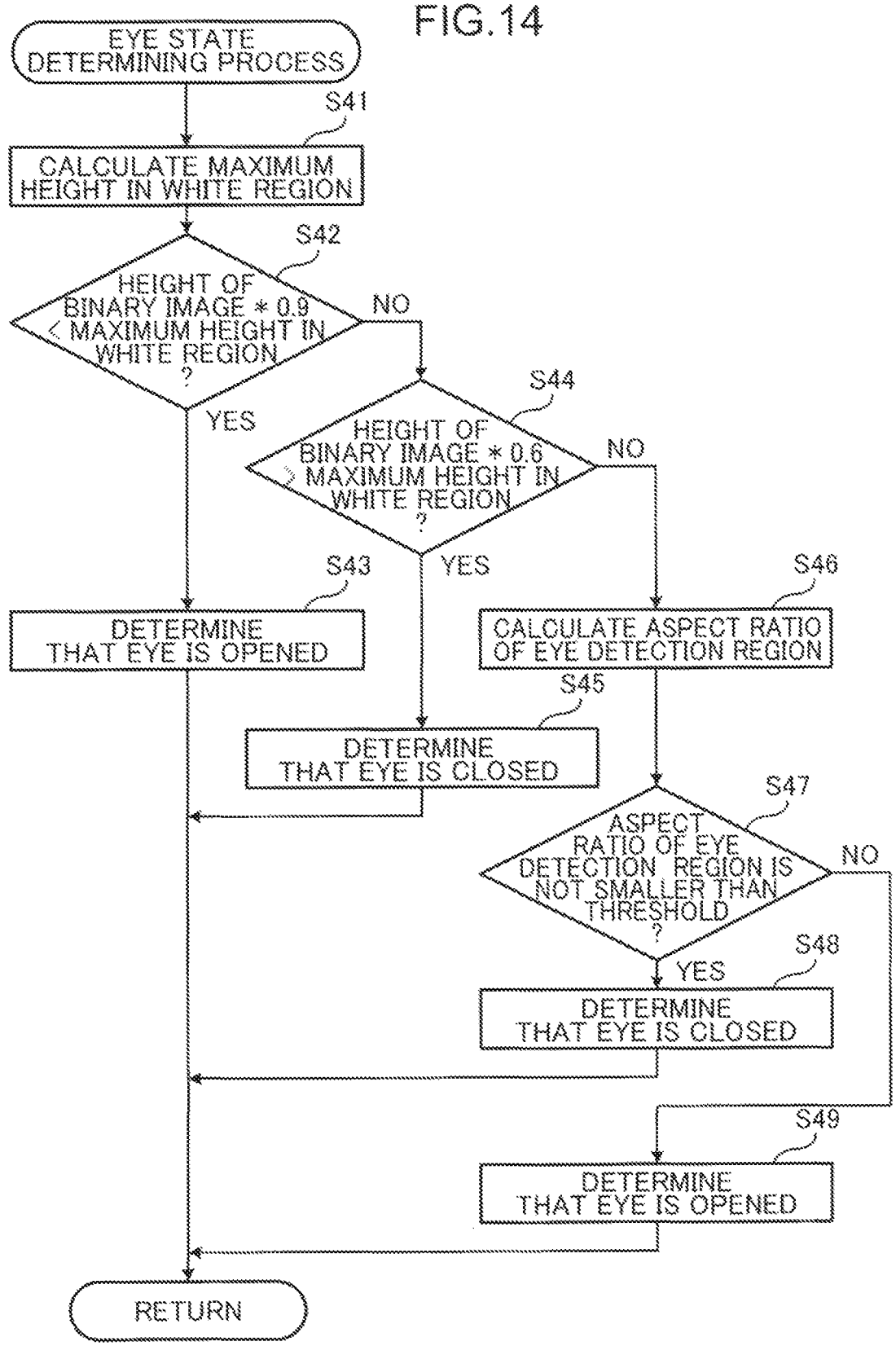
FIG. 14 is a flowchart showing an exemplary eye state determining process in the embodiment 2.

FIG. 14 is a flowchart showing an exemplary eye state determining process in the embodiment 2.

Since the processings in the steps S41 to S45 are the same as those in the steps S11 to S15 in FIG. 4, the description thereof will be omitted.

When the maximum height in the white region is determined to be not smaller than the value obtained by multiplying the height of the binary image of the eye detection region by 0.6 (NO in the step S44), the aspect ratio determining part 16 calculates in the step S46 the aspect ratio of the eye detection region by dividing the width (length in the horizontal directions) of the eye detection region by the height thereof (length in the vertical directions).

Figure 15:
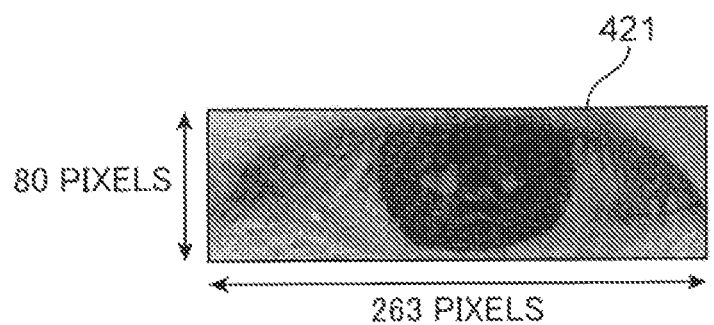
FIG. 15 is an illustration showing an exemplary eye detection region of an opened eye.
Figure 16:
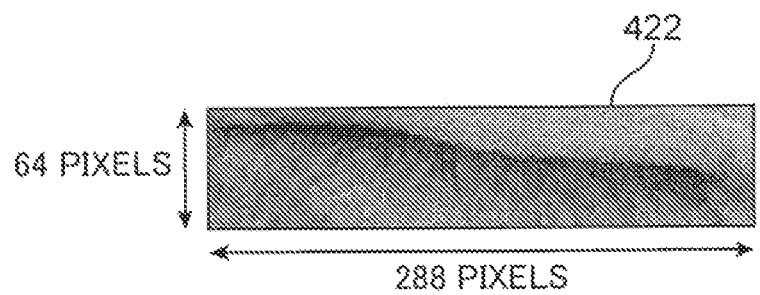
FIG. 16 is an illustration showing an exemplary eye detection region of a closed eye.

FIG. 15 is an illustration showing an exemplary eye detection region 421 of an opened eye. FIG. 16 is an illustration showing an exemplary eye detection region 422 of a closed eye.

As shown in FIGS. 15 and 16, each of the eye detection regions 421, 422 has a rectangular shape. The eye detection region 421 shown in FIG. 15 includes an opened eye. The eye detection region 422 shown in FIG. 16 includes a closed eye.

For example, the width of the eye detection region 421 is 263 pixels; the height of the eye detection region 421 is 80 pixels; and the aspect ratio of the eye detection region 421 is 3.29. For example, the width of the eye detection region 422 is 288 pixels; the height of the eye detection region 422 is 64 pixels; and the aspect ratio of the eye detection region 422 is 4.5.

As exemplified above, the aspect ratio of the eye detection region 422 of the closed eye is larger than the aspect ratio of the eye detection region 421 of the opened eye.

Reference is back to FIG. 14. Next, in the step S47, the aspect ratio determining part 16 determines whether the aspect ratio of the eye detection region is not smaller than a threshold. The threshold is, for example, 4.0. When the aspect ratio of the eye detection region is determined to be not smaller than the threshold (YES in the step S47), the aspect ratio determining part 16 determines in the step S48 that the eye is closed.

On the other hand, when the aspect ratio of the eye detection region is determined to be smaller than the threshold (NO in the step S47), the aspect ratio determining part 16 determines in the step S49 that the eye is opened.

As described above, even in the case that opening and closing of an eye are undeterminable on the basis of the height of the binary image and the maximum height in the white region, opening and closing of the eye can be determined on the basis of the aspect ratio of the eye detection region, which enables improvement of the accuracy in the detection of opening and closing of an eye of a person.

Embodiment 3

In the embodiment 1, the eye state determining part 14 determines that opening and closing of the eye are undeterminable when the maximum height in the white region is determined to be not smaller than the value obtained by multiplying the height of the binary image of the eye detection region by the second factor (e.g., 0.6). In contrast, in the embodiment 3, when the maximum height in the white region is determined to be not smaller than the value obtained by multiplying the height of the binary image of the eye detection region by the second factor (e.g., 0.6), the eye detection region represented by the red component, the green component, and the blue component is converted into an HSV image represented by a hue component, a saturation component, and a value component, and opening and closing of the eye are determined on the basis of a binary image of the hue component of the HSV image.

Figure 17:
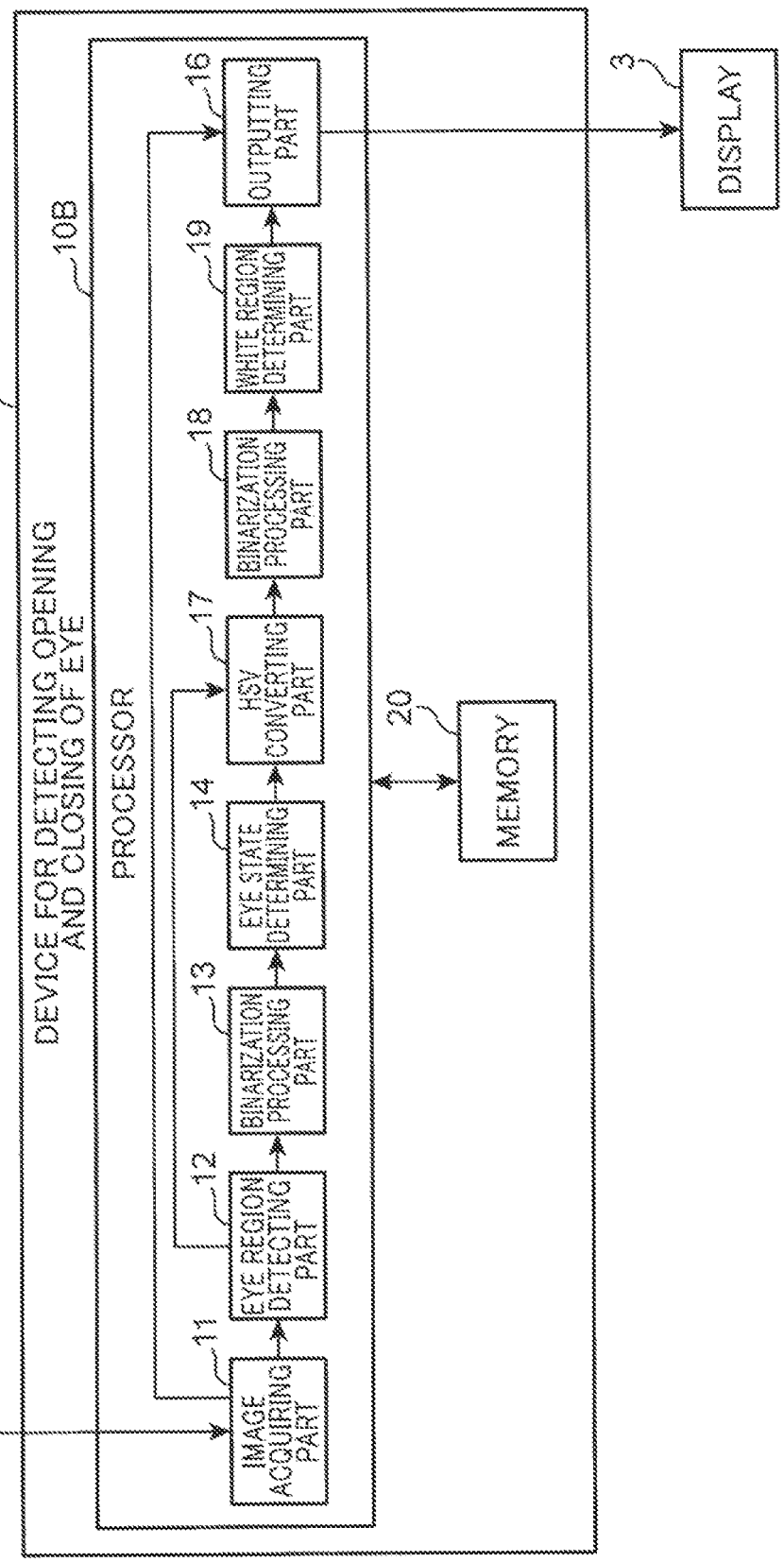
FIG. 17 is a block diagram showing an exemplary whole structure of a system for detecting opening and closing of an eye according to an embodiment 3 of the present disclosure.

FIG. 17 is a block diagram showing an exemplary whole structure of a system 100B for detecting opening and closing of an eye according to the embodiment 3 of the present disclosure. In the embodiment 3, the same constituents as those in the embodiment 1 are denoted by the same reference numerals, and the description thereof will be omitted.

The device 1B for detecting opening and closing of an eye includes a processor 10B and a memory 20. The processor 10B further includes an HSV converting part 17, a binarization processing part 18, and a white region determining part 19 in comparison with the processor 10 of the device 1 for detecting opening and closing of an eye in the embodiment 1.

The HSV converting part 17 generates, from an eye detection region (in RGB image) represented by the red component, the green component, and the blue component, an HSV image represented by a hue component, a saturation component, and a value component when the eye state determining part 14 determines that the maximum height in the first luminance region is not smaller than the value obtained by multiplying the height of the binary image by the second factor. The HSV image is an exemplary fifth image.

The HSV converting part 17 generates the HSV image from the eye detection region with a conversion equation for conversion of an RGB image into an HSV image. Since the conversion equation is a conventional technique, the description thereof will be omitted.

The binarization processing part 18 generates a binary image in which a pixel having a gradation value smaller than a threshold is represented at a third luminance value and a pixel having a gradation value not smaller than the threshold is represented at a fourth luminance value, by binarizing the hue component of the HSV image. The binary image is an exemplary sixth image. The binarization process is executed, for example, by Otsu's method. The binarization processing part 18 may execute a binarization process on the hue component of the HSV image. The third luminance value and the fourth luminance value are represented in, for example, white and black, respectively. The respective luminance values of white and black are represented at, for example, 255 and 0.

The white region determining part 19 determines, on the basis of a third luminance region having the third luminance value, whether the eye of the person is opened or closed. The third luminance value is represented in white. The white region determining part 19 detects from the binary image a white region where a plurality of white pixels continue. The white region determining part 19 determines, on the basis of the number or the size of white regions detected from the binary image, whether the eye of the person is opened or closed. The white region determining part 19 determines that the eye is opened when the number of the white regions detected from the binary image is not smaller than a threshold. The white region determining part 19 determines that the eye is closed when the number of the white regions detected from the binary image is smaller than the threshold.

The white region determining part 19 may determine that the eye is opened when the number of pixels of the largest white region detected from the binary image is not smaller than a threshold. The white region determining part 19 may determine that the eye is closed when the number of pixels of the largest white region detected from the binary image is smaller than the threshold. The white region determining part 19 may determine that the eye is closed when there is no white region in the binary image.

Next, the eye state determining process in the embodiment 3 will be described. In the embodiment 3, the eye opening and closing detection process, except for the eye state determining process, is the same as the eye opening and closing detection process in the embodiment 1 shown in FIG. 3.

Figure 18:
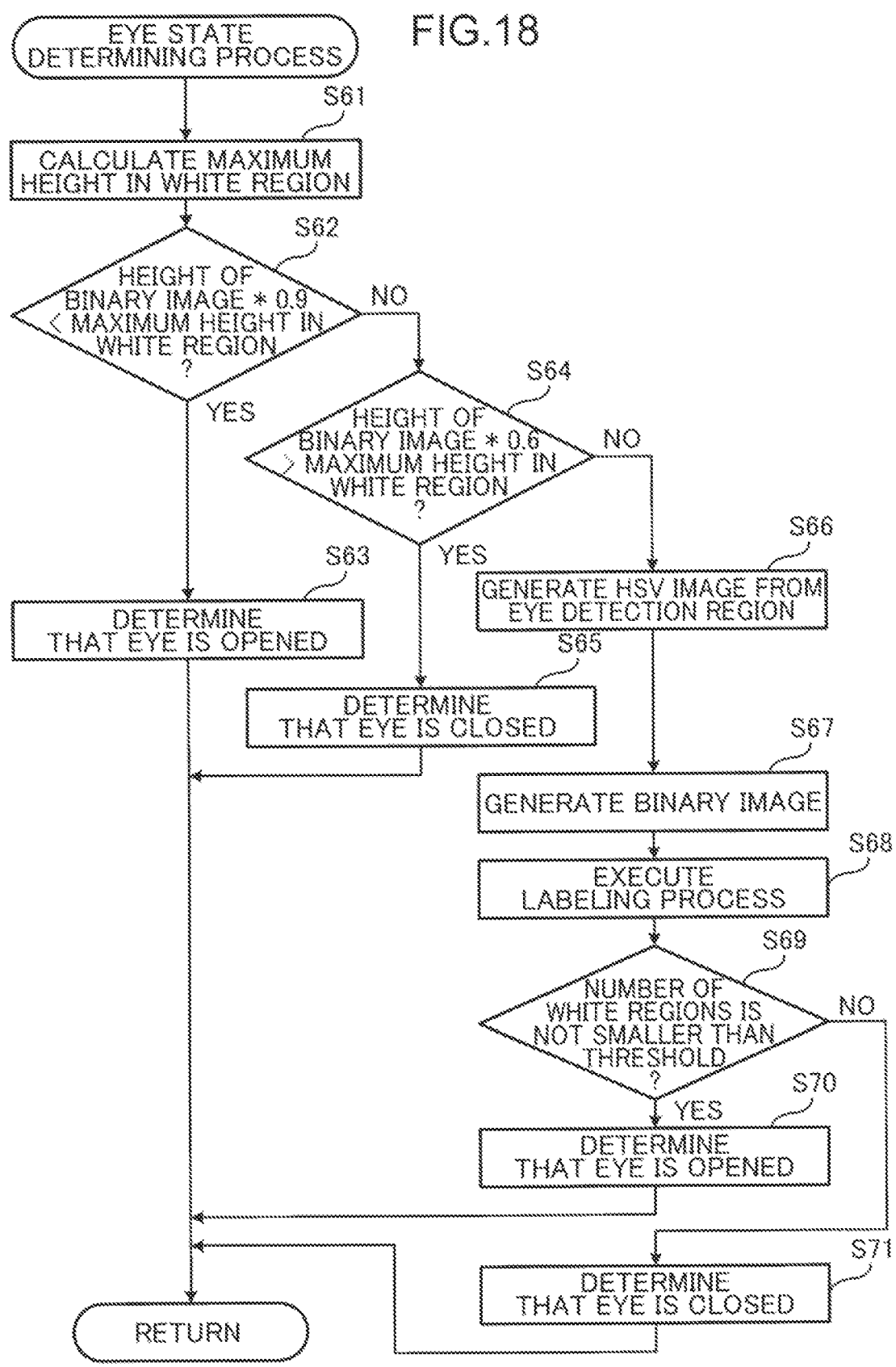
FIG. 18 is a flowchart showing an exemplary eye state determining process in the embodiment 3.

FIG. 18 is a flowchart showing an exemplary eye state determining process in the embodiment 3.

Since the processings in the steps S61 to S65 are the same as those in the steps S11 to S15 shown in FIG. 4, the description thereof will be omitted.

When the maximum height in the white region is determined to be not smaller than the value obtained by multiplying the height of the binary image of the eye detection region by 0.6 (NO in the step S64), the HSV converting part 17 generates in the step S66 an HSV image represented by the HSV color space from the eye detection region represented by the RGB color space.

Next, in the step S67, the binarization processing part 18 generates a binary image by binarizing the hue component of the HSV image.

Next, in the step S68, the white region determining part 19 executes a labeling process on the binary image. In the labeling process, an identical number is assigned to a plurality of continuing white pixels in the binary image. By the labeling process, a plurality of white regions each consisting of a plurality of continuing white pixels are detected from the binary image.

Figure 19:
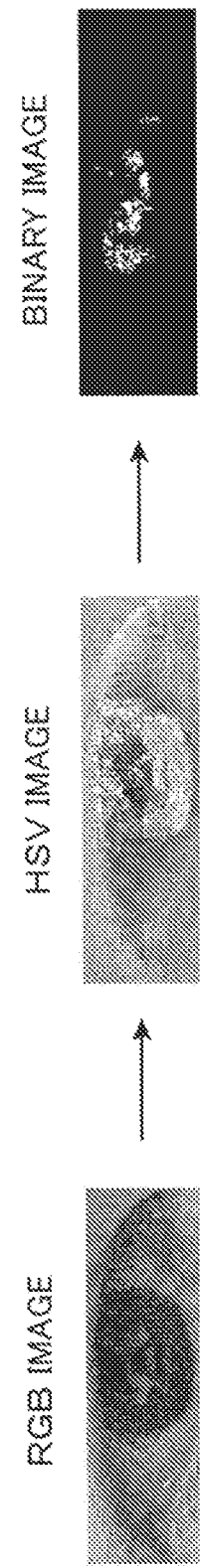
FIG. 19 are illustrations showing an RGB image, an HSV image, and a binary image of an opened eye, respectively.
Figure 20:
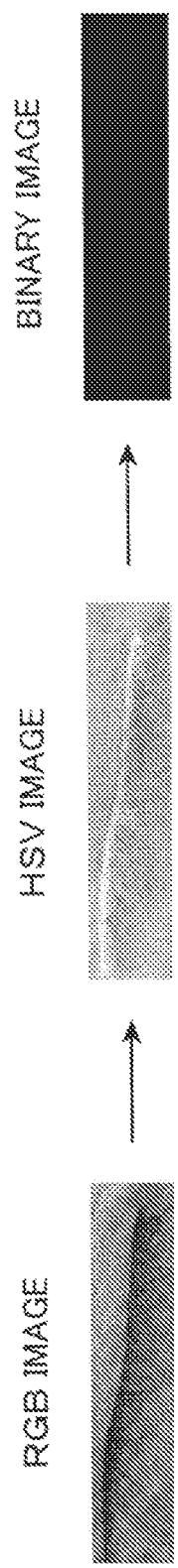
FIG. 20 are illustrations showing an RGB image, an HSV image, and a binary image of a closed eye, respectively.

FIG. 19 are illustrations showing an RGB image, an HSV image, and a binary image of an opened eye, respectively. FIG. 20 are illustrations showing an RGB image, an HSV image, and a binary image of a closed eye, respectively.

As shown in FIG. 19, the cornea part (dark grey part) in the eye detection region (in RGB image) of the opened eye reflects light. The difference between a taken RGB image of an opened eye and a taken RGB image of a closed eye is whether the cornea part reflects light or not. In other words, the cornea part of the opened eye reflects light while there is no cornea part when the eye is closed. The light reflected in the cornea part stands out in the hue component in the HSV color space. A feature value representing the light reflected in the cornea part is extracted by an HSV image is generated from the RGB image, and a binary image of the hue component in the HSV image is generated. As shown in FIG. 19, there is a white region representing the light reflected in the cornea part in the binary image of the hue component of an opened eye. On the other hand, as shown in FIG. 20, there is no white region representing the light reflected in the cornea part in the binary image of the hue component of a closed eye. The white region determining part 19 can determine opening and closing of the eye by totaling the number of the white regions in the binary image of the hue component.

Reference is back to FIG. 18. In the step S69, the white region determining part 19 determines whether the number of the white regions is not smaller than a threshold. When the number of the white regions is determined to be not smaller than the threshold (YES in the step S69), the white region determining part 19 determines in the step S70 that the eye is opened.

On the other hand, when the number of the white regions is determined to be smaller than the threshold (NO in the step S69), the white region determining part 19 determines in the step S71 that the eye is closed.

As described above, even in the case that opening and closing of an eye are undeterminable on the basis of the height of the binary image of the eye detection region in RGB image and the maximum height in the white region, opening and closing of the eye can be determined on the basis of the generated binary image of the hue component of the eye detection region in HSV image, which enables improvement of the accuracy in the detection of opening and closing of an eye of a person.

The embodiments 2 and 3 can be combined with each other. In other words, the processings in the steps S66 to S71 in FIG. 18 may be executed when the aspect ratio of the eye detection region is determined to be smaller than the threshold in the step S47 in FIG. 14 (NO in the step S47).

Embodiment 4

In the embodiment 1, opening and closing of the eye are detected. In contrast, in the embodiment 4, a position of an upper eyelid and a position of a lower eyelid are further detected.

Figure 21:
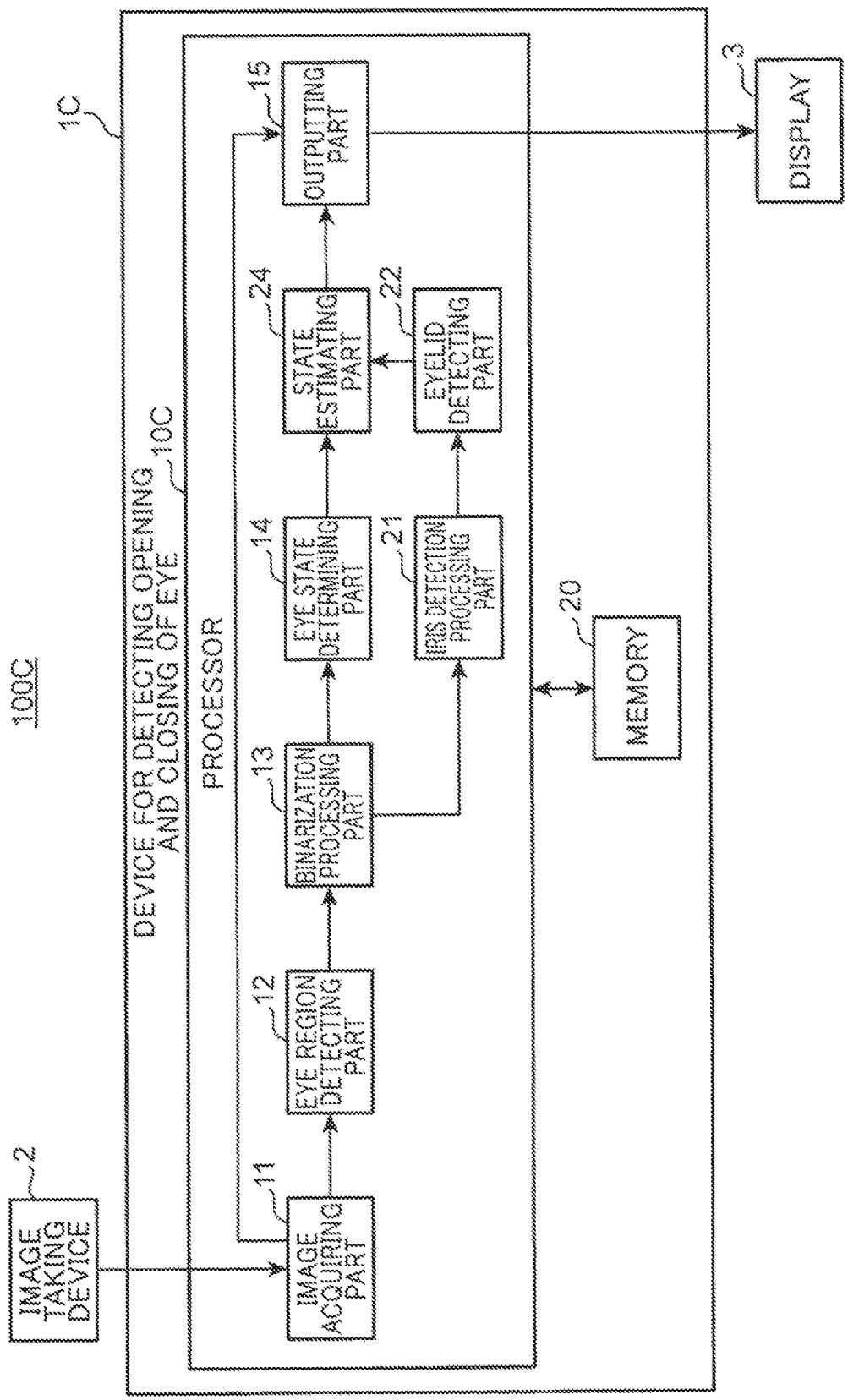
FIG. 21 is a block diagram showing an exemplary whole structure of a system for detecting opening and closing of an eye according to an embodiment 4 of the present disclosure.

FIG. 21 is a block diagram showing an exemplary whole structure of a system 100C for detecting opening and closing of an eye according to the embodiment 4 of the present disclosure. The device 1C for detecting opening and closing of an eye in the embodiment 4 further detects the position of the upper eyelid and the position of the lower eyelid. In the embodiment 4, the same constituents as those in the embodiment 1 are denoted by the same reference numerals, and the description thereof will be omitted.

The processor 10C of the device 1C for detecting opening and closing of an eye further includes an iris detection processing part 21, an eyelid detecting part 22, and a state estimating part 24 in comparison with the processor 10 of the device 1 for detecting opening and closing of an eye in the embodiment 1.

The iris detection processing part 21 generates a binary image by replacing a pixel which has the second luminance value in a first luminance region having the first luminance value in the binary image generated by the binarization processing part 13 and satisfies a predetermined condition with a pixel having the first luminance value. The iris detection processing part 21 calculates iris information indicative of at least one of a position and a size of an iris of the person using the binary image.

The eyelid detecting part 22 detects each position of the upper eyelid and the lower eyelid of the person U1 on the basis of the binary image generated by the binarization processing part 13. The eyelid detecting part 22 may detect the position of the upper eyelid and the position of the lower eyelid by performing a morphological gradient operation on the binary image. The eyelid detecting part 22 detects the position of the upper eyelid and the position of the lower eyelid in each binary image of the left eye and the right eye.

The state estimating part 24 estimates a state of the person on the basis of opening and closing of the eye of the person determined by the eye state determining part 14, and the position of the upper eyelid and the position of the lower eyelid of the person detected by the eyelid detecting part 22. The state of the person is, for example, a degree of wakefulness of the person. For example, the state estimating part 24 estimates the degree of wakefulness of the person on the basis of opening and closing of the eye, and the position of the upper eyelid and the position of the lower eyelid.

The state of the person may be, for example, a degree of fatigue of the person. For example, the state estimating part 24 may estimate the degree of fatigue of the person on the basis of opening and closing of the eye, and the position of the upper eyelid and the position of the lower eyelid.

The state estimating part 24 may estimate a feeling of the person on the basis of opening and closing of the eye of the person determined by the eye state determining part 14, and the position of the upper eyelid and the position of the lower eyelid of the person detected by the eyelid detecting part 22.

Next, the process by the device 1C for detecting opening and closing of an eye in the embodiment 4 will be described.

Figure 22:
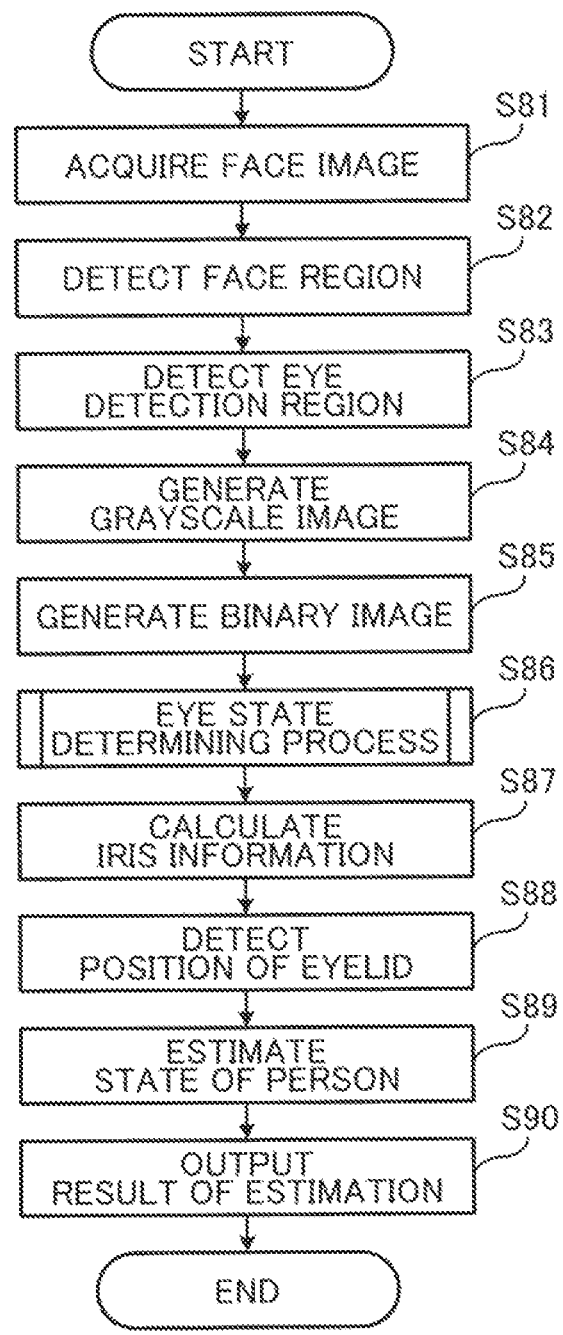
FIG. 22 is a flowchart showing an exemplary process by a device for detecting opening and closing of an eye according to the embodiment 4 of the present disclosure.

FIG. 22 is a flowchart showing an exemplary process by the device 1C for detecting opening and closing of an eye according to the embodiment 4 of the present disclosure.

Since the processings in the steps S81 to S86 are the same as those in the steps S1 to S6 shown in FIG. 3, the description thereof will be omitted.

Next, in the step S87, the iris detection processing part 21 calculates iris information by executing an iris detecting process on the binary image generated by the binarization processing part 13.

The iris detecting process executed by the iris detection processing part 21 will be described.

First, the iris detection processing part 21 divides the binary image into a plurality of local regions by separating the binary image by predetermined pixels in X directions. For example, the iris detection processing part 21 divides the binary image into ten local regions equally in a lateral direction. The binary image is thereby divided into ten local regions in the shape of a strip of which longitudinal direction extends along Y directions. The iris detection processing part 21 is assumed to divide the binary image into ten local regions, but this is merely an example. The number of divisions may be integer from 2 to 9, or may be integer of 11 or more. The Y directions mean the longitudinal directions (vertical directions) of the image taken by the image taking device 2.

The iris detection processing part 21 then calculates the respective average luminance values of the ten local regions.

The iris detection processing part 21 then calculates the X coordinate of an estimated iris central position. The estimated iris central position is a position estimated to be the iris central position and is different from the iris central position that will be finally calculated. The regions of a double eyelid, a thick eyelash, and a false eyelash may be represented as large white regions. In this case, there is likelihood that the region of the white part of an eye is changed over. To prevent such a problem, the estimated iris central position is calculated in the embodiment 4.

The iris detection processing part 21 estimates the coordinate of the midpoint in the X directions of the local region that has the maximum average luminance value among the plurality of local regions to be the X coordinate of the estimated iris central position. In this regard, due to the width in the X directions of the local region, there is a case where the midpoint of the local region in the X directions is not appropriate for the X coordinate of the estimated iris central position. In this case, the left or right edge of the local region in the X directions may be estimated to be the X coordinate of the estimated iris central position.

The iris detection processing part 21 then calculates the Y coordinate of the estimated iris central position. In the local region where the X coordinate of the estimated iris central position is present, the iris detection processing part 21 detects the uppermost end point and the lowermost end point of the white pixels, and estimates the midpoint of the uppermost end point and the lower most end point to be the Y coordinate of the estimated iris central position. In this regard, the uppermost end point and the lowermost end point may be detected in a left local region or a right local region adjacent to the local region, due to the eyelash and make-up. Therefore, the iris detection processing part 21 may calculate the respective uppermost end points and the respective lowermost end points of the local region where the X coordinate of the estimated iris central position is present, and of the two local regions that are adjacent to the local region, i.e., the left local region and the right local region; calculate the average uppermost end point by averaging the three calculated uppermost end points and calculate the average lowermost end point by averaging the three calculated lowermost end points; and estimates the midpoint of the average uppermost end point and the average lowermost end point to be the Y coordinate of the estimated iris central position.

The iris detection processing part 21 then executes a change-over process on the binary image. In the visible light image, a cornea may reflect external light or a background due to the brightness of the surroundings. In the case that this reflection is large, a region in bright color such as white appears within the colored part of the eye in black or brown. In this case, an island region in black appears within a region of the colored part of the eye after the image of the eye is binarized, which prevents highly accurate detection of the iris information. Therefore, in the embodiment 4, a change-over process of changing over the island region in black is executed.

The details of the change-over process are as follows. First, the iris detection processing part 21 sets a vertical line passing through the X coordinate of the estimated iris central position and parallel to the Y directions in the binary image. The iris detection processing part 21 then detects the uppermost white pixel on the vertical line in the binary image as an upper end pixel. The iris detection processing part 21 then detects the lowermost white pixel on the vertical line in the binary image as a lower end pixel. The iris detection processing part 21 then determines whether a distance between the upper end pixel and the lower end pixel is larger than a first reference distance. When the iris detection processing part 21 determines that the distance between the upper end pixel and the lower end pixel is larger than the first reference distance, the iris detection processing part 21 estimates a black pixel between the upper end pixel and the lower end pixel on the vertical line to be the black pixel that satisfies a predetermined condition; and replaces the black pixel with a white pixel. On the other hand, when the iris detection processing part 21 determines that the distance between the upper end pixel and the lower end pixel is not larger than the first reference distance, the replacement of the vertical line is not performed. A proper first reference distance is determined, for example, on the basis of an estimated iris diameter.

The iris detection processing part 21 executes the change-over process on each vertical line within a left reference range from the estimated iris central position toward the left in the X directions and on each vertical line within a right reference range from the estimated iris central position toward the right in the X directions. The sum of the left reference range and the right reference range is an exemplary second reference distance. An exemplary length of the left reference range is the same as that of the right reference distance. The second reference distance is, for example, slightly longer than the estimated iris diameter. The change-over process can be thereby executed intensively on the vertical lines set in the region of the colored part of the eye.

The iris detection processing part 21 then detects a left edge pixel and a right edge pixel of the region of the colored part of the eye. In the white region of the binary image, the iris detection processing part 21 examines the change in luminance value pixel by pixel from the estimated iris central position to the right and the left in the X directions; detects the first left black pixel therefrom in the X directions as the left edge pixel; and detects the first right black pixel therefrom in the X directions as the right edge pixel.

The iris detection processing part 21 then determines the middle position of the left edge pixel and the right edge pixel to be the X coordinate of the iris central position.

The iris detection processing part 21 then detects an upper edge pixel and a lower edge pixel of the region of the colored part of the eye. In the white region of the binary image, the iris detection processing part 21 examines the change in luminance value pixel by pixel from the X coordinate of the iris central position upward and downward in the Y directions; detects the first upper black pixel therefrom in the Y directions as the upper edge pixel; and detects the first lower black pixel therefrom in the Y directions as the lower edge pixel.

The iris detection processing part 21 then determines the middle position of the upper edge pixel and the lower edge pixel to be the Y coordinate of the iris central position. Thus, the iris central position is calculated.

The iris detecting process is as described above. The iris detection processing part 21 calculates the iris information including the iris central position.

Next, in the step S88, the eyelid detecting part 22 detects a position of the upper eyelid and a position of the lower eyelid by a morphological gradient operation.

Figure 23:
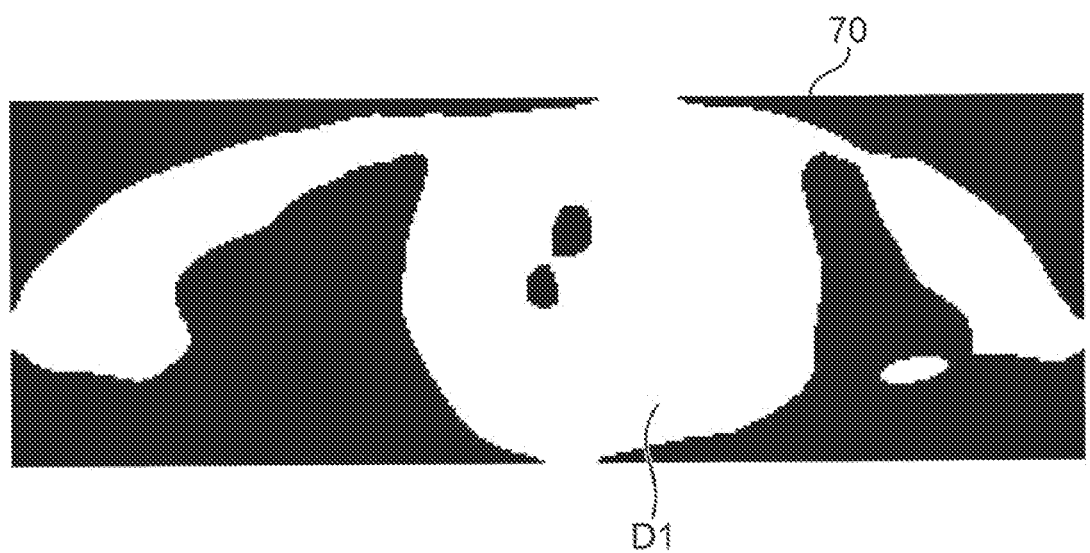
FIG. 23 is an illustration showing a binary image before a morphological gradient operation is performed.

FIG. 23 is an illustration showing a binary image 70 before a morphological gradient operation is performed.

In FIG. 23, a generated binary image 70 has dark parts of the eye detection region such as a colored part of an eye and an eyelash which are represented by white and bright parts of the eye detection region such as a white part of the eye and skin which are represented by black. The white region D1 shown in FIG. 23 consists of white pixels.

The eyelid detecting part 22 executes a dilation process on the binary image 70. The dilation process is a process of replacing a pixel of interest with a white pixel when there is at least one white pixel around the pixel of interest. The eyelid detecting part 22 then executes an erosion process on the binary image 70. The erosion process is a process of replacing a pixel of interest with a black pixel when there is at least one black pixel around the pixel of interest.

Figure 24:
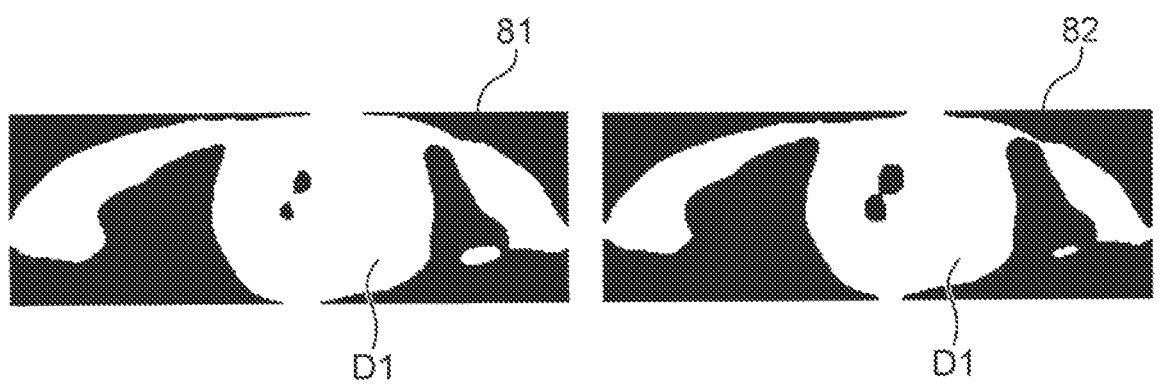
FIG. 24 are illustrations showing a dilation image and an erosion image obtained by executing a dilation process and an erosion process on a binary image, respectively.

FIG. 24 are illustrations showing a dilation image 81 and an erosion image 82 obtained by executing a dilation process and an erosion process on a binary image 70, respectively.

The execution of the dilation process dilates the white region D1 included in the binary image 70 to the white region D1 included in the dilation image 81. The execution of the erosion process erodes the white region D1 included in the binary image 70 to the white region D1 included in the erosion image 82.

The eyelid detecting part 22 then calculates a gradient image by subtracting the erosion image 82 from the dilation image 81.

Figure 25:
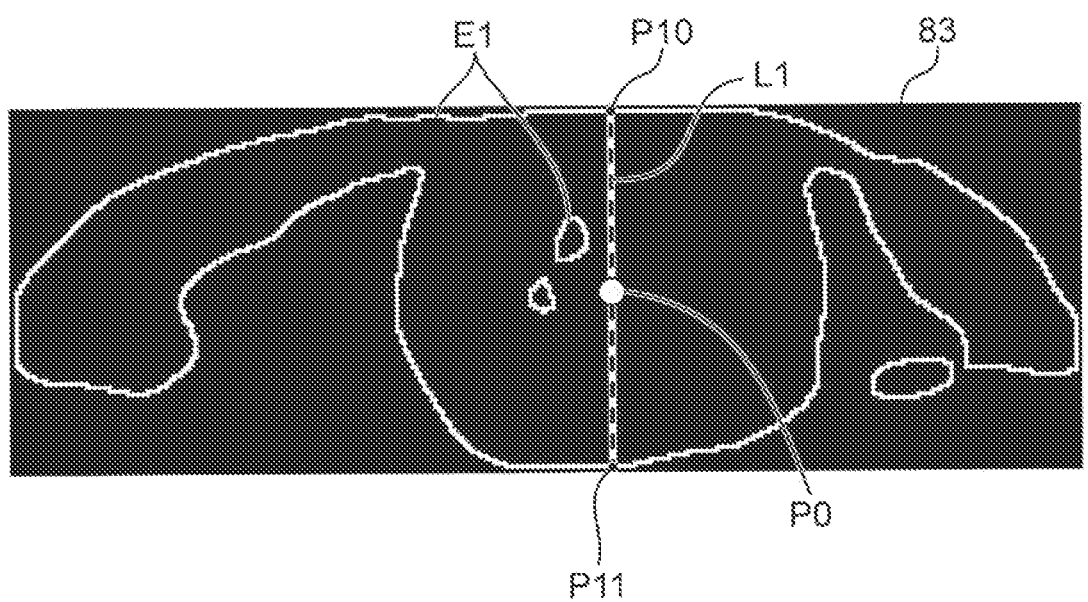
FIG. 25 is an illustration showing a gradient image.

FIG. 25 is an illustration showing a gradient image 83. The gradient image 83 includes an edge E1 of the white region D1 in the binary image 70.

The eyelid detecting part 22 then detects the uppermost position of the edge E1 as a position P10 of the upper eyelid. The eyelid detecting part 22 may detect an intersection of a vertical line passing through the iris central position P0 detected by the iris detection processing part 21 and the edge E1 on the upper side as the position P10 of the upper eyelid. The eyelid detecting part 22 detects an intersection of the vertical line passing through the iris central position P0 detected by the iris detection processing part 21 and the edge E1 on the lower side as a position P11 of the lower eyelid. This configuration enables detection of a position of a lower eyelid, which hardly stands out in the binary image 70 due to little change in luminance. The eyelid detecting part 22 may detect an upper portion of the edge E1 which connects the left side and the right side of the gradient image 83 as an upper eyelid line.

The eyelid detecting part 22 may detect the uppermost position of the edge E1 as the position P10 of the upper eyelid; and detect an intersection of a straight line extending vertically downward from the detected position P10 of the upper eyelid and the lowermost end of the edge E1 as the position P11 of the lower eyelid. In this case, the detection of the iris central position P0 is not required, thus enabling omission of the processing in the step S87.

Next, in the step S89, the state estimating part 24 estimates a state of the person on the basis of opening and closing of the eye of the person determined by the eye state determining part 14, and the position of the upper eyelid and the position of the lower eyelid of the person detected by the eyelid detecting part 22. In this estimation, the state estimating part 24 calculates a distance between the position of the upper eyelid and the position of the lower eyelid when the eye is opened. The state estimating part 24 calculates a ratio of the distance between the position of the upper eyelid and the position of the lower eyelid to the height of the eye detection region. The state estimating part 24 estimates that the degree of wakefulness of the person decreases when the calculated ratio is not larger than a threshold. The state estimating part 24 estimates that the degree of wakefulness of the person is high when the calculated ratio is larger than the threshold. The state estimating part 24 estimates that the person is not awake, i.e., is sleeping, when both eyes are closed.

The state estimating part 24 may estimate that the degree of fatigue of the person is high, when the calculated ratio is not larger than the threshold. The state estimating part 24 may estimate that the degree of fatigue of the person is low, when the calculated ratio is larger than the threshold.

Next, in the step S90, the outputting part 15 generates a display picture in which a result of the estimation by the state estimating part 24 is superimposed on the face image calculated in the step S1, and displays the display picture on the display 3. For example, the display picture shows the face image with the state of the person (e.g., the degree of wakefulness). The outputting part 15 may display on the display 3 the result of the determination of opening and closing of the eye of the person superimposed on the face image.

The state estimating part 24 may estimate whether the upper eyelid twitches or not on the basis of chronological data of the position P10 of the upper eyelid. In other words, the state estimating part 24 estimates the upper eyelid to twitch when the position P10 of the upper eyelid moves up and down at predetermined intervals during a predetermined period.

As described above, a state or a feeling of a person can be estimated on the basis of a result of the determination of opening and closing of the eye and a result of the detection of the position of the upper eyelid and the position of the lower eyelid.

Embodiment 5

In the embodiment 1, opening and closing of the eye are detected. In contrast, in the embodiment 5, a position of an eye outer corner and a position of an eye inner corner are further detected.

Figure 26:
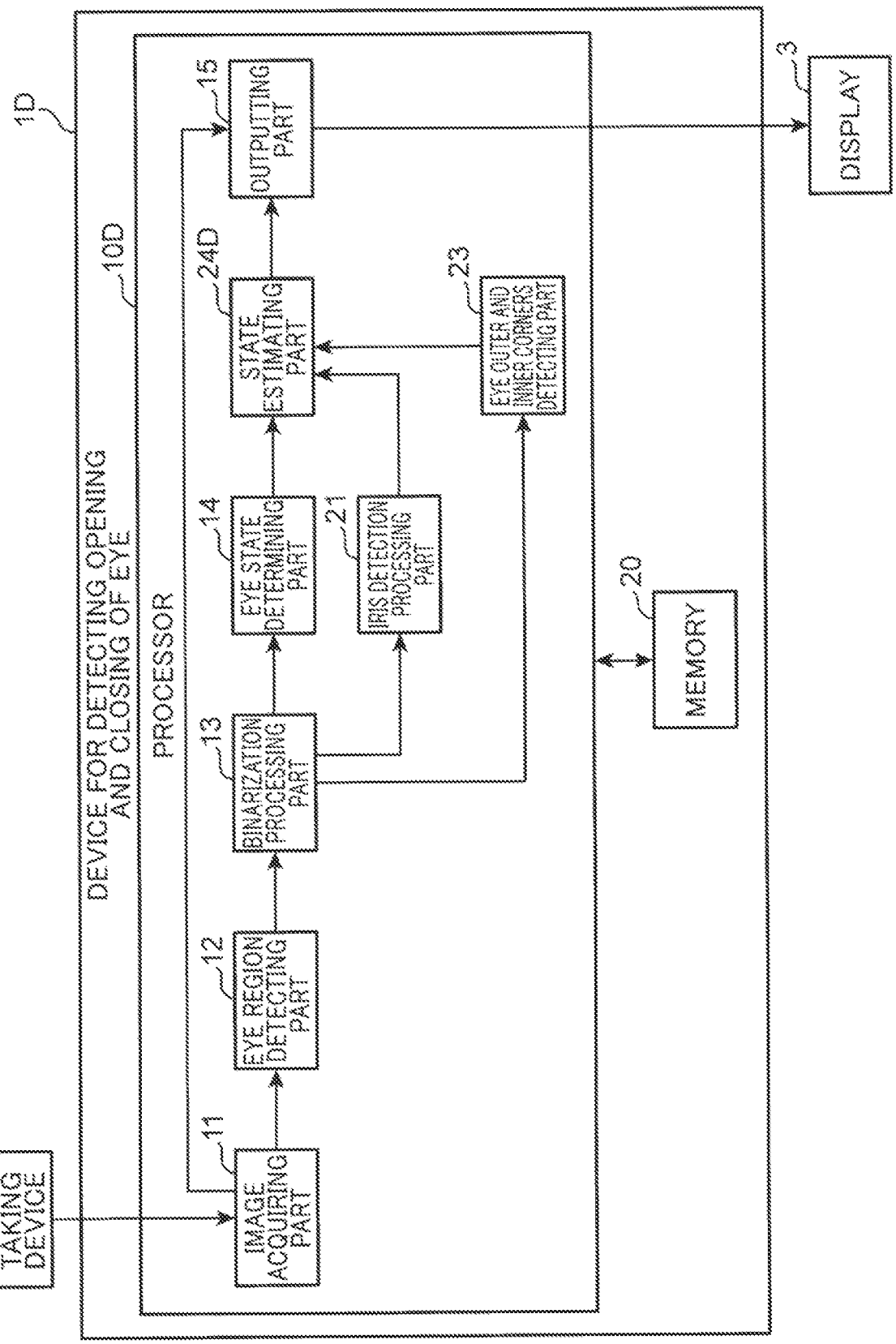
FIG. 26 is a block diagram showing an exemplary whole structure of a system for detecting opening and closing of an eye according to an embodiment 5 of the present disclosure.

FIG. 26 is a block diagram showing an exemplary whole structure of a system 100D for detecting opening and closing of an eye according to the embodiment 5 of the present disclosure. The device 1D for detecting opening and closing of an eye in the embodiment 5 further detects the position of the eye outer corner and the position of the eye inner corner. In the embodiment 5, the same constituents as those in the embodiments 1 and 4 are denoted by the same reference numerals, and the description thereof will be omitted.

The processor 10D of the device 1D for detecting opening and closing of an eye further includes an iris detection processing part 21, an eye outer and inner corners detecting part 23, and a state estimating part 24D in comparison with the processor 10 of the device 1 for detecting opening and closing of an eye in the embodiment 1.

The eye outer and inner corners detecting part 23 detects each position of the eye outer corner and the eye inner corner from the binary image generated by the binarization processing part 13. The eye outer and inner corners detecting part 23 detects each position of the eye outer corner and the eye inner corner on the basis of the binary image of one of the right eye and the left eye of the person. The eye outer and inner corners detecting part 23 detects the position of the eye outer corner and the position of the eye inner corner in each binary image of the left eye and the right eye.

In the binary image, the eye outer and inner corners detecting part 23 detects a position of a pixel which has the first luminance value and is on a left side in lateral directions as the position of one of the eye outer corner and the eye inner corner; and a position of a pixel which has the first luminance value and is on a right side in the lateral directions as the position of the other of the eye outer corner and the eye inner corner.

The state estimating part 24D estimates a state of the person on the basis of opening and closing of the eye of the person determined by the eye state determining part 14, the position of the eye outer corner and the position of the eye inner corner of the person detected by the eye outer and inner corners detecting part 23, and the iris central position detected by the iris detection processing part 21. The state of the person is, for example, perplexity, agitation, or tension of the person. For example, the state estimating part 24D estimates that the person is perplexed, agitated, or tense, on the basis of opening and closing of the eye, the position of the eye outer corner and the position of the eye inner corner, and the iris central position.

Specifically, in the case that the person is perplexed, agitated, or tense, the number of openings-closings (the number of blinks) of the eye becomes larger than usual and the colored part of the eye is likely to wiggle to the right and left. Therefore, the state estimating part 24D determines whether the eye blinks not less than a predetermined number of times during a predetermined period, on the basis of chronological data of opening and closing of the eye.

The state estimating part 24D calculates a distance between the iris central position and the position of the eye outer corner, or a distance between the iris central position and the position of the eye inner corner. The state estimating part 24D determines whether or not the iris central position wiggles to the right and left, on the basis of chronological data of the distance between the iris central position and the position of the eye outer corner or the distance between the iris central position and the position of the eye inner corner. In other words, the state estimating part 24D determines that the iris central position wiggles to the right and left, when the distance between the iris central position and the position of the eye outer corner changes a predetermined number of times during a predetermined period. The state estimating part 24D may determine that the iris central position wiggles to the right and left, when the distance between the iris central position and the position of the eye inner corner changes the predetermined number of times during the predetermined period.

The state estimating part 24D estimates that the person is perplexed, agitated, or tense, when the state estimating part 24D determines that: the eye blinks not less than the predetermined number of times during the predetermined period; and the iris central position wiggles to the right and left.

The state estimating part 24D may estimate a feeling of the person on the basis of opening and closing of the eye of the person determined by the eye state determining part 14, the position of the eye outer corner and the position of the eye inner corner of the person detected by the eye outer and inner corners detecting part 23, and the iris central position detected by the iris detection processing part 21.

Next, the process by the device 1D for detecting opening and closing of an eye in the embodiment 5 will be described.

Figure 27:
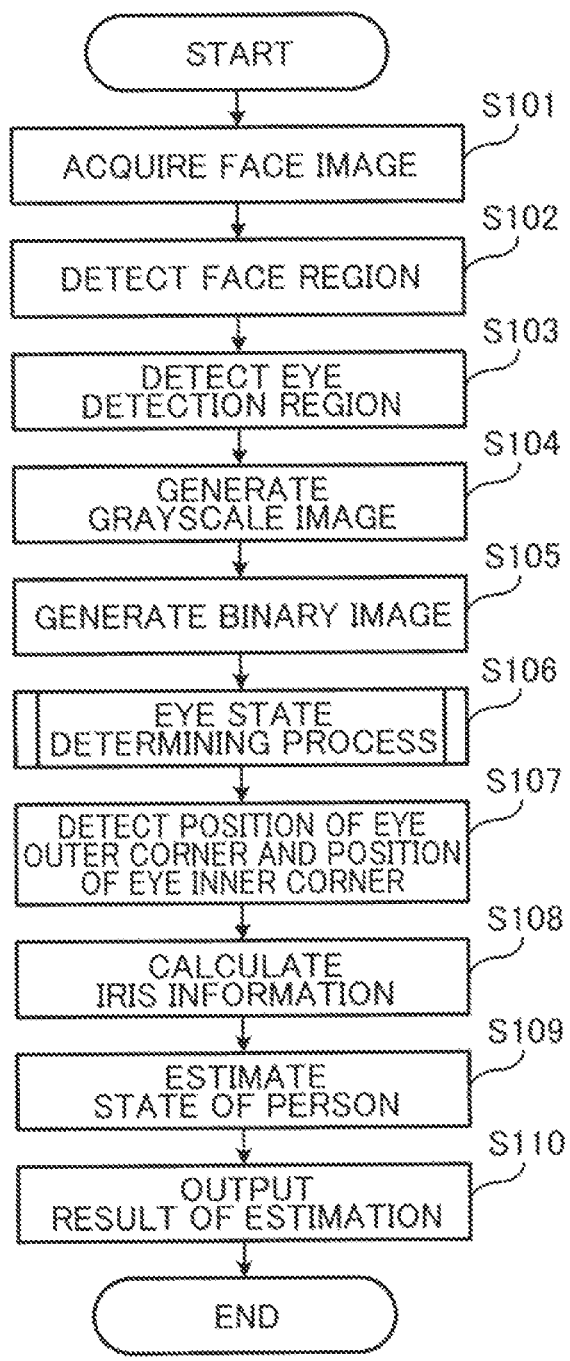
FIG. 27 is a flowchart showing an exemplary process by a device for detecting opening and closing of the eye according to the embodiment 5 of the present disclosure.

FIG. 27 is a flowchart showing an exemplary process by the device 1D for detecting opening and closing of an eye according to the embodiment 5 of the present disclosure.

Since the processings in the steps S101 to S106 are the same as those in the steps S1 to S6 shown in FIG. 3, the description thereof will be omitted.

Next, in the step S107, the eye outer and inner corners detecting part 23 detects a position of the eye outer corner and a position of the eye inner corner.

Figure 28:
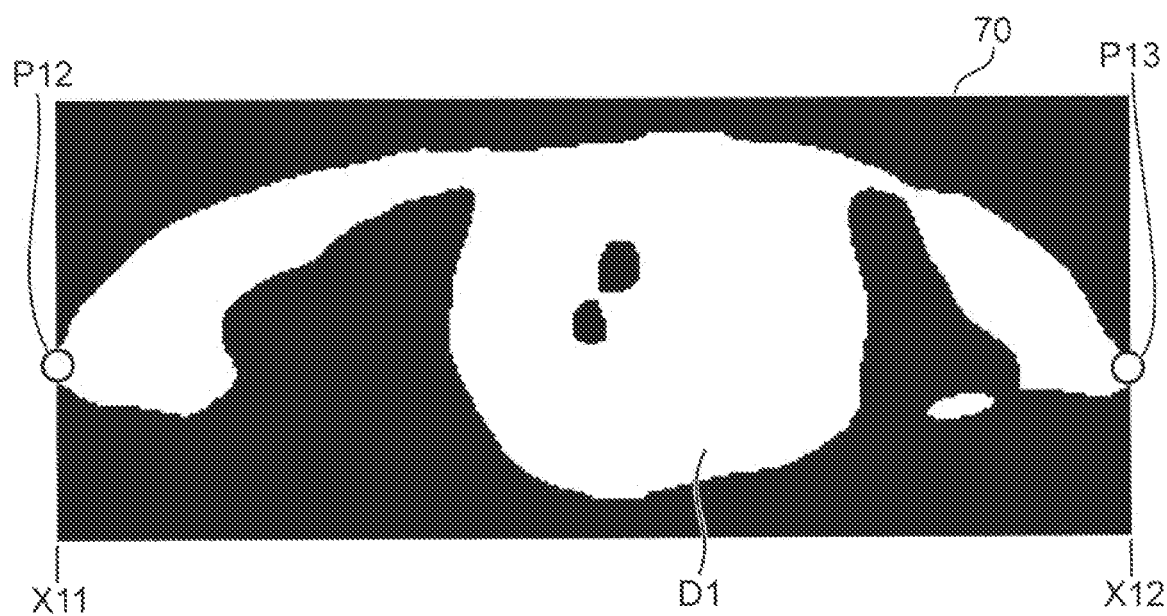
FIG. 28 is an illustration showing a binary image including a detected eye outer corner and a detected eye inner corner.

FIG. 28 is an illustration showing a binary image 70 including the detected position of the eye outer corner and the detected position of the eye inner corner.

The frame of the binary image 70 has a rectangular shape circumscribed on the white region D1. Thus, in the binary image 70, the X coordinate of the left side of the white region D1 is equal to the X coordinate (X11) of the left side of the binary image 70; and the X coordinate of the right side of the white region D1 is equal to the X coordinate (X12) of the right side of the binary image 70. Both of the X coordinates of the binary image 70 have been calculated in the generation thereof. Therefore, the eye outer and inner corners detecting part 23 calculates a position P12 of the eye outer corner and a position P13 of the eye inner corner on the basis of the calculated X coordinates. FIG. 28 shows the binary image 70 of the left eye. Thus, the left side of the white region D1 corresponds to the position P12 of the eye outer corner, and the right side of the white region D1 corresponds to the position P13 of the eye inner corner.

Specifically, on the X coordinate (X11), the eye outer and inner corners detecting part 23 searches for a white pixel from the lower end of the binary image 70 toward the upper end thereof pixel by pixel and detects the first white pixel, to determine the Y coordinate thereof as the Y coordinate of the position P12 of the eye outer corner. Similarly, on the X coordinate (X12), the eye outer and inner corners detecting part 23 searches for a white pixel from the lower end of the binary image 70 toward the upper end thereof pixel by pixel and detects the first white pixel, to determine the Y coordinate thereof as the Y coordinate of the position P13 of the eye inner corner. Thus, the position P12 of the eye outer corner and the position P13 of the eye inner corner are detected.

Since the processing in the step S108 is the same as that in the step S87 shown in FIG. 22, the description thereof will be omitted.

Next, in the step S109, the state estimating part 24D estimates a state of the person on the basis of opening and closing of the eye of the person determined by the eye state determining part 14, the position of the eye outer corner and the position of the eye inner corner of the person detected by the eye outer and inner corners detecting part 23, and the iris central position detected by the iris detection processing part 21.

Next, in the step S110, the outputting part 15 generates a display picture in which a result of the estimation by the state estimating part 24D is superimposed on the face image calculated in the step S1, and displays the display picture on the display 3. For example, the display picture shows the face image with a result of the estimation of the state of the person. The outputting part 15 may display on the display 3 the result of the determination of opening and closing of the eye of the person superimposed on the face image.

As described above, a state or a feeling of a person can be estimated on the basis of a result of the determination of opening and closing of the eye, a result of the detection of the position of the eye outer corner and the position of the eye inner corner, and a result of the detection of the iris central position.

The system 100D for detecting opening and closing of an eye may further include an input device for performing an input operation based on a movement of an eye. For example, the input device may allow a pointer displayed on the display 3 to move according to a distance between: the iris central position; and the position of the eye outer corner or the position of the eye inner corner.

In the embodiments described above, each constituent is constituted by dedicated hardware, or may do performance by executing a software program appropriate for each constituent. Each constituent may do performance by the reading and execution by a program executing part such as a CPU or a processor of a software program stored in a storage medium such as a hard disk or a semiconductor memory. The program may be executed by another independent computer system by transmitting the storage medium storing the program or transmitting the program via a network.

A part or all of the functions of the device according to the embodiments of the present disclosure are carried out using a Large Scale Integration (LSI) that is typically an integrated circuit. The respective functions may be individually performed by single chips. Alternatively, a part or all of the functions may be performed by a single chip. Additionally, circuit integration is not limited to an LSI and may be realized using a dedicated circuit or a general-purpose processor. A Field Programmable Gate Array (FPGA) that can be programmed after LSI production or a reconfigurable processor that allows connection or reconfiguration of circuit cells inside an LSI after LSI production may be used.

A part or all of the functions of the device according to the embodiments of the present disclosure may be carried out by execution of a program by a processor such as a CPU.

All of the numbers mentioned above are merely examples for describing the present disclosure specifically, which the present disclosure is not limited to.

The order in which each of the steps is executed, shown in the above-mentioned flowchart, is merely an example for describing the present disclosure specifically, and may be varied as long as the similar effects can be exerted. Some of the above-mentioned steps may be executed simultaneously (in parallel) with another step.

INDUSTRIAL APPLICABILITY

The technique according to the present disclosure enables improvement of accuracy in detection of opening and closing of an eye of a person and thus is useful as a technique of detecting opening and closing of an eye of a person from an image.

The invention claimed is:

1. A method for detecting opening and closing of an eye, by a computer, comprising:
   acquiring a first image taken by an image taking device, including a face of a person;
   generating a second image including an eye region of the person from the first image;
   generating a third image in which pixels having a gradation value smaller than a threshold are represented at a first luminance value and pixels having a gradation value not smaller than the threshold are represented at a second luminance value, by binarizing the second image;
   determining whether the eye of the person is opened or closed, on the basis of a height of the third image and a maximum height which is the maximum of a vertical distance between an upper pixel and a lower pixel in a first luminance region having the first luminance value; and
   outputting information indicative of a result of the determination,
   wherein, in the determining:
      it is determined whether the maximum height in the first luminance region is larger than a value obtained by multiplying the height of the third image by a first factor; and
      it is determined that the eye is opened when the maximum height in the first luminance region is determined to be larger than the value obtained by multiplying the height of the third image by the first factor.

2. The method for detecting opening and closing of an eye according to claim 1, wherein, in the determining:
   it is determined whether the maximum height in the first luminance region is smaller than a value obtained by multiplying the height of the third image by a second factor smaller than the first factor when the maximum height in the first luminance region is determined to be not larger than the value obtained by multiplying the height of the third image by the first factor; and
   it is determined that the eye is closed when the maximum height in the first luminance region is determined to be smaller than the value obtained by multiplying the height of the third image by the second factor.

3. The method for detecting opening and closing of an eye according to claim 2, further comprising generating a fourth image indicative of a face region of the person from the first image, wherein, in the determining, it is determined whether the maximum height in the first luminance region is smaller than a value obtained by multiplying a height of the fourth image by the second factor and a third factor smaller than the second factor when the maximum height in the first luminance region is determined to be not smaller than the value obtained by multiplying the height of the third image by the second factor; and
   the eye is determined to be closed when the maximum height in the first luminance region is smaller than the value obtained by multiplying the height of the fourth image by the second factor and the third factor; and the eye is determined to be opened when the maximum height in the first luminance region is not smaller than the value obtained by multiplying the height of the fourth image by the second factor and the third factor.

4. The method for detecting opening and closing of an eye according to claim 1, further comprising generating a fourth image indicative of a face region of the person from the first image, wherein, in the determining, it is determined whether the maximum height in the first luminance region is smaller than a value obtained by multiplying a height of the fourth image by a second factor smaller than the first factor and a third factor smaller than the second factor when the maximum height in the first luminance region is determined to be not larger than the value obtained by multiplying the height of the third image by the first factor; and
   the eye is determined to be closed when the maximum height in the first luminance region is determined to be smaller than the value obtained by multiplying the height of the fourth image by the second factor and the third factor; and the eye is determined to be opened when the maximum height in the first luminance region is not smaller than the value obtained by multiplying the height of the fourth image by the second factor and the third factor.

5. The method for detecting opening and closing of an eye according to claim 2, wherein the second image has a rectangular shape; and
   in the determining, it is determined whether the eye of the person is opened or closed on the basis of a ratio between a height and a width of the second image when the maximum height in the first luminance region is determined to be not smaller than the value obtained by multiplying the height of the third image by the second factor.

6. The method for detecting opening and closing of an eye according to claim 2, wherein the second image is represented by a red component, a green component, and a blue component, further comprising:
   generating from the second image a fifth image represented by a hue component, a saturation component, and a value component when the maximum height in the first luminance region is determined to be not smaller than the value obtained by multiplying the height of the third image by the second factor;
   generating a sixth image in which a pixel having a gradation value smaller than a threshold is represented at a third luminance value and a pixel having a gradation value not smaller than the threshold is represented at a fourth luminance value, by binarizing the hue component of the fifth image; and
   determining, on the basis of a third luminance region having the third luminance value, whether the eye of the person is opened or closed.

7. The method for detecting opening and closing of an eye according to claim 1, further comprising:
   detecting each position of an upper eyelid and a lower eyelid on the basis of the third image.

8. The method for detecting opening and closing of an eye according to claim 7, wherein, in the detection of the position of the upper eyelid and the position of the lower eyelid, a morphological gradient operation on the third image is performed to detect the position of the upper eyelid and the position of the lower eyelid.

9. The method for detecting opening and closing of an eye according to claim 1, wherein the third image is a binary image of one of a right eye and a left eye of the person, further comprising:
   detecting each position of an eye outer corner and an eye inner corner on the basis of the third image.

10. The method for detecting opening and closing of an eye according to claim 9, wherein, in the detection of the position of the eye outer corner and the position of the eye inner corner in the third image,
- a position of a pixel which has the first luminance value and is on a left side in lateral directions is detected as the position of one of the eye outer corner and the eye inner corner; and
- a position of a pixel which has the first luminance value and is on a right side in the lateral directions is detected as the position of the other of the eye outer corner and the eye inner corner.

11. The method for detecting opening and closing of an eye according to claim 1, further comprising:
- superimposing information indicating whether the eye is opened or closed on a face image of the person on a display.

12. A device for detecting opening and closing of an eye, comprising:
- a memory; and
- a processor that executes instructions stored on the memory in order to:
- acquire a first image taken by an image taking device, including a face of a person;
- generate a second image including an eye region of the person from the first image;
- generate a third image in which pixels having a gradation value smaller than a threshold are represented at a first luminance value and pixels having a gradation value not smaller than the threshold are represented at a second luminance value, by binarizing the second image;
- determine whether the eye of the person is opened or closed, on the basis of a height of the third image and a maximum height which is the maximum of a vertical distance between an upper pixel and a lower pixel in a first luminance region having the first luminance value; and
- output information indicative of a result of the determination,
- wherein, in determining whether the eye is opened or closed, the processor determines:
  - whether the maximum height in the first luminance region is larger than a value obtained by multiplying the height of the third image by a first factor; and
  - that the eye is opened when the maximum height in the first luminance region is determined to be larger than the value obtained by multiplying the height of the third image by the first factor.

13. A non-transitory computer-readable recording medium recording a program for detecting opening and closing of an eye, the program causing a computer to execute processings of:
- acquiring a first image taken by an image taking device, including a face of a person;
- generating a second image including an eye region of the person from the first image;
- generating a third image in which pixels having a gradation value smaller than a threshold are represented at a first luminance value and pixels having a gradation value not smaller than the threshold are represented at a second luminance value, by binarizing the second image;
- determining whether the eye of the person is opened or closed, on the basis of a height of the third image and a maximum height which is the maximum of a vertical distance between an upper pixel and a lower pixel in a first luminance region having the first luminance value; and
- outputting information indicative of a result of the determination,
- wherein, in the determining:
  - it is determined whether the maximum height in the first luminance region is larger than a value obtained by multiplying the height of the third image by a first factor; and
  - it is determined that the eye is opened when the maximum height in the first luminance region is determined to be larger than the value obtained by multiplying the height of the third image by the first factor.

* * * * *